United States Patent
Sinha et al.

(10) Patent No.: US 11,140,134 B2
(45) Date of Patent: Oct. 5, 2021

(54) HIGH-THROUGHPUT DATA INTEGRITY VIA TRUSTED COMPUTING

(71) Applicant: Visa International Service Association, San Francisco, CA (US)

(72) Inventors: Rohit Sinha, San Jose, CA (US); Mihai Christodorescu, San Jose, CA (US)

(73) Assignee: VISA INTERNATIONAL SERVICE ASSOCIATION, San Francisco, CA (US)

(*) Notice: Subject to any disclaimer, the term of this patent is extended or adjusted under 35 U.S.C. 154(b) by 150 days.

(21) Appl. No.: 16/189,818

(22) Filed: Nov. 13, 2018

(65) Prior Publication Data

US 2019/0268308 A1    Aug. 29, 2019

Related U.S. Application Data

(60) Provisional application No. 62/635,933, filed on Feb. 27, 2018.

(51) Int. Cl.
*G06F 21/00*   (2013.01)
*H04L 29/06*   (2006.01)
(Continued)

(52) U.S. Cl.
CPC ...... *H04L 63/0281* (2013.01); *G06F 16/2246* (2019.01); *G06F 16/2255* (2019.01);
(Continued)

(58) Field of Classification Search
CPC ......... H04L 63/08; H04L 63/10; H04L 67/10; H04L 63/0428; H04L 63/20;
(Continued)

(56) References Cited

U.S. PATENT DOCUMENTS

2010/0212017 A1   8/2010  Li et al.
2011/0283085 A1*  11/2011  Dilger ............... G06F 11/1004
                                              711/216
(Continued)

FOREIGN PATENT DOCUMENTS

KR    20170091248    *  8/2017
WO      2008014002       1/2008
(Continued)

OTHER PUBLICATIONS

PCT/US2018/042844, "International Search Report and Written Opinion", dated Nov. 26, 2018, 10 pages.
(Continued)

*Primary Examiner* — Ghazal B Shehni
(74) *Attorney, Agent, or Firm* — Kilpatrick Townsend & Stockton LLP

(57) ABSTRACT

Verification system and methods are provided for allowing database server responses to be verified. A proxy device may maintain a data structure (e.g., a Merkle B+-tree) within a secure memory space (e.g., an Intel SGX enclave) associated with a protected application. In some embodiments, the data structure may comprise hashed values representing hashed versions of the data managed by the database server. The proxy may intercept client requests submitted from a client device and forward such requests to the database server. Responses from the database server may be verified using the data structure (e.g., the hashes contained in the Merkle B+-tree). If the data is verified by the proxy device, the response may be transmitted to the client device.

20 Claims, 12 Drawing Sheets

(51) Int. Cl.
  *H04L 29/08* (2006.01)
  *G06F 16/22* (2019.01)
(52) U.S. Cl.
  CPC ........ *H04L 63/123* (2013.01); *H04L 67/2842* (2013.01); *H04L 67/42* (2013.01)
(58) Field of Classification Search
  CPC .............. H04L 63/0281; H04L 63/123; H04L 67/2842; H04L 67/42; G06F 16/2255; G06F 16/2246
  See application file for complete search history.

(56) References Cited

U.S. PATENT DOCUMENTS

| | | | |
|---|---|---|---|
| 2012/0110336 A1* | 5/2012 | Frey | G06F 12/1408 713/181 |
| 2013/0117227 A1 | 5/2013 | Kruglick | |
| 2014/0020072 A1* | 1/2014 | Thomas | H04L 63/102 726/7 |
| 2014/0317686 A1* | 10/2014 | Vetillard | G06F 21/606 726/2 |
| 2016/0134592 A1 | 5/2016 | Sedayao | |
| 2016/0275461 A1* | 9/2016 | Sprague | H04L 9/3234 |
| 2017/0075938 A1 | 3/2017 | Black et al. | |

FOREIGN PATENT DOCUMENTS

| | | |
|---|---|---|
| WO | 2010149333 | 12/2010 |
| WO | 2018005403 | 1/2018 |

OTHER PUBLICATIONS

Bajaj et al., "Correctdb : Sql Engine With Practical Query Authentication", Proceedings of the Vldb Endowment, vol. 6, No. 7, May 1, 2013, pp. 529-540.

Edward et al., "The Aegis Processor Architecture for Tamper-evident and Tamper-resistant Processing", MIT Laboratory for Computer Science, Jan. 28, 2003, pp. 1-19.

Application No. EP18907982.5 , Extended European Search Report, dated Nov. 11, 2020, 10 pages.

Gassend et al., "Caches and Hash Trees for Efficient Memory Integrity Verification", Proceedings of the the Ninth International Symposium on High-Performance Computer Architecture (HPCA-9'03), Feb. 2003.

Mast et al., "Enabling Strong Database Integrity using Trusted Execution Environments", Arxiv.Org, Cornell University Library, Jan. 5, 2018, pp. 1-19.

Mast et al., "Scaling Databases Through Trusted Hardware Proxies", Proceedings of Systex'17:2nd Workshop on System Software for Trusted Execution, Oct. 28, 2017, pp. 1-6.

* cited by examiner

| API π[z].op | RESULT π[z].res | PROPERTY |
|---|---|---|
| *insert(k,v) | ok<br><br>key_present_error | ¬∃ x< z: π[x] = (insert(k,v), ok)) ∧ ∀y. x<y<z: π[y] ≠ (delete(k), ok) |
| *get(k) | (ok,v)<br><br>key_missing_error | ∃x. x< z ∧(π[x] = (put(k,v), ok)) ∨ π[x] = (insert(k,v), ok)) ∧<br><br>(∀y, v'). x<y<z ⇒ π[y] ≠ (delete(k), ok) ∧ π[y] ≠ (put(k,v'), ok))<br><br>¬∃ x< z: π[x] = (insert(k,v), ok)) ∧ ∀y. x<y<z: π[y] ≠ (delete(k), ok) |
| *put(k) | ok<br><br>key_missing_error | ∃ x< z: π[x] = (insert(k,v), ok)) ∧ ∀y. x<y<z: π[y] ≠ (delete(k), ok)<br><br>¬∃ x< z: π[x] =⇒(insert(k,v), ok)) ∧ ∀y. x<y<z: π[y] ≠ (delete(k), ok) |
| *delete(k) | ok<br><br>key_missing_error | ∃ x< z: π[x] = (insert(k,v), ok)) ∧ ∀y. x<y<z: π[y] ≠ (delete(k), ok)<br><br>¬∃ x< z: π[x] = (insert(k,v), ok)) ∧ ∀y. x<y<z: π[y] ≠ (delete(k), ok) |

200 

*FIG. 2*

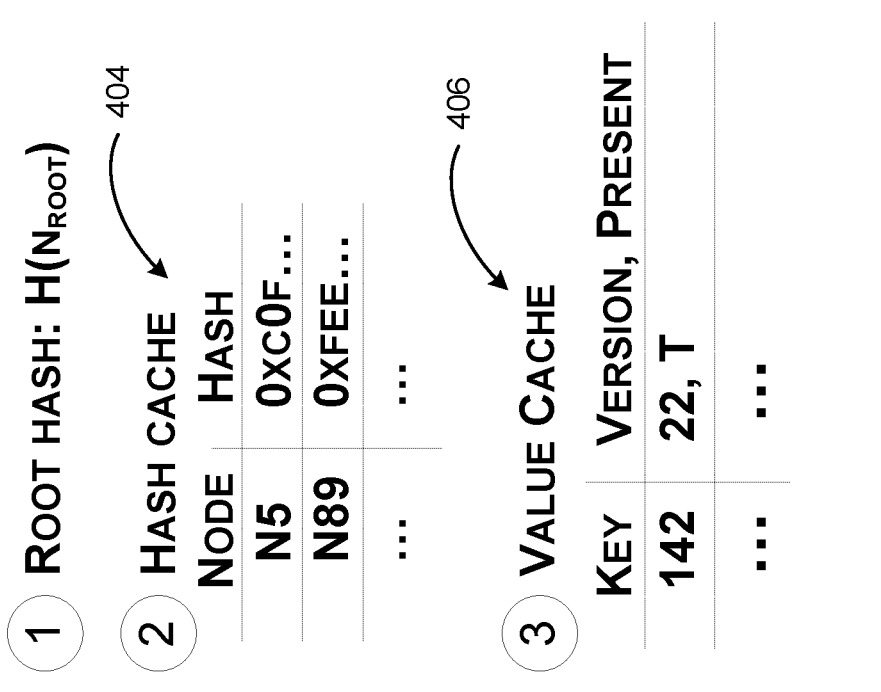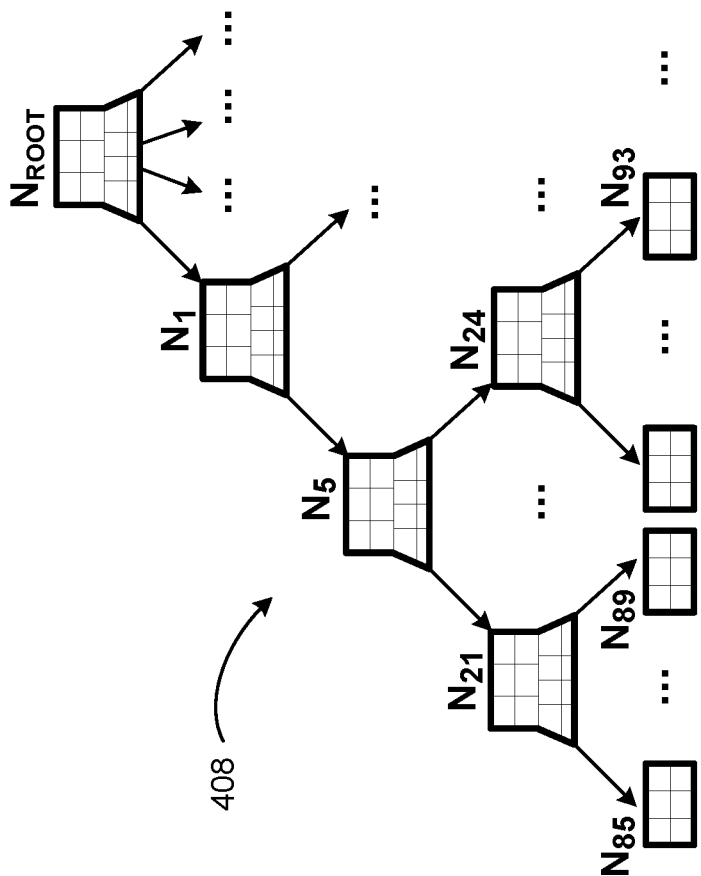
FIG. 4

HIGH-THROUGHPUT DATA INTEGRITY VIA TRUSTED COMPUTING

CROSS-REFERENCE TO RELATED APPLICATIONS

This application claims priority to U.S. Patent Application No. 62/635,933, filed on Feb. 27, 2018, the disclosure of which is herein incorporated by reference in its entirety for all purposes.

BACKGROUND

While businesses are increasingly shifting their databases to the cloud, they continue to depend on them to operate correctly. Alarmingly, cloud services constantly face threats from exploits in the privileged computing layers (e.g. OS, Hypervisor, etc.) and attacks from rogue datacenter administrators, which tamper with the database's storage and cause it to produce incorrect results. Moreover, as application developers adopt new database engines that promise exceedingly high levels of performance, implementation bugs in the database engine may lead to disasters in production. Although integrity verification of outsourced storage and file systems is a well-studied problem, current techniques impose prohibitive overheads.

Embodiments of the invention address these and other problems individually and collectively.

SUMMARY

Embodiments are directed to methods, systems, and computer products for providing secure data integrity checking. A proxy may mediate communication between a client and an untrusted server (e.g., a database server), which may include a database engine (e.g., Redis, RocksDB, etc.). The proxy may operate as a separate device and/or at least some portion of the proxy may execute on the untrusted server. The proxy can receive and transform a client request (a data request received from a client device) before forwarding to the server and check the correctness of the server's response before forwarding the response to the client. In some embodiments, the proxy can utilize a protected environment such as a secure memory space (e.g., one or more Intel SGX enclave(s)) to isolate sensitive code and data within the secure memory space. The secure memory space can be inaccessible to all other software running on the machine. The secure memory space may be utilized to host the proxy's code and trusted state. Within the secure memory space, the proxy can maintain a data structure (e.g., a Merkle B+-tree) that can be used to provide data integrity checking. The data structure may include hashes of the data stored in a database managed by the server. The proxy can compare the data for each response from the server against some portion of the hashes within the data structure. If the response data and the hashes match, the proxy can determine that the response is valid and forward the response to the client.

A computer-implemented method for providing secure data integrity checking may comprise maintaining, by a protected application of a proxy device, a data structure for performing a process for data integrity verification in response to client requests. In some embodiments, the proxy device may store instructions of the protected application within a secure memory space that may be allocated and managed by a chip set of the proxy device. The method may further comprise receiving, at a network interface of the proxy device from a client device, a client request for data managed by a database server computer. The method may further comprise transmitting the client request from the proxy device to the database server computer. The method may further comprise receiving, by the proxy device from the database server computer, a response to the client request, the response comprising data requested by the client request. The method may further comprise verifying, at the proxy device, integrity of the data of the response from the database server computer, the data being verified utilizing the data structure maintained by the proxy device. The method may further comprise transmitting, from the proxy device to the client device, the response when the response is verified.

These and other embodiments of the invention are described in detail below. For example, other embodiments are directed to systems, devices, and computer readable media associated with methods described herein.

A better understanding of the nature and advantages of embodiments of the present invention may be gained with reference to the following detailed description and the accompanying drawings.

BRIEF DESCRIPTION OF THE DRAWINGS

FIG. 2 provides a table describing integrity guarantees for each operation, based on a result type, in accordance with at least one embodiment;

FIG. 4 illustrates two cache structures, in accordance with at least one embodiment;

TERMS

Figure 1:
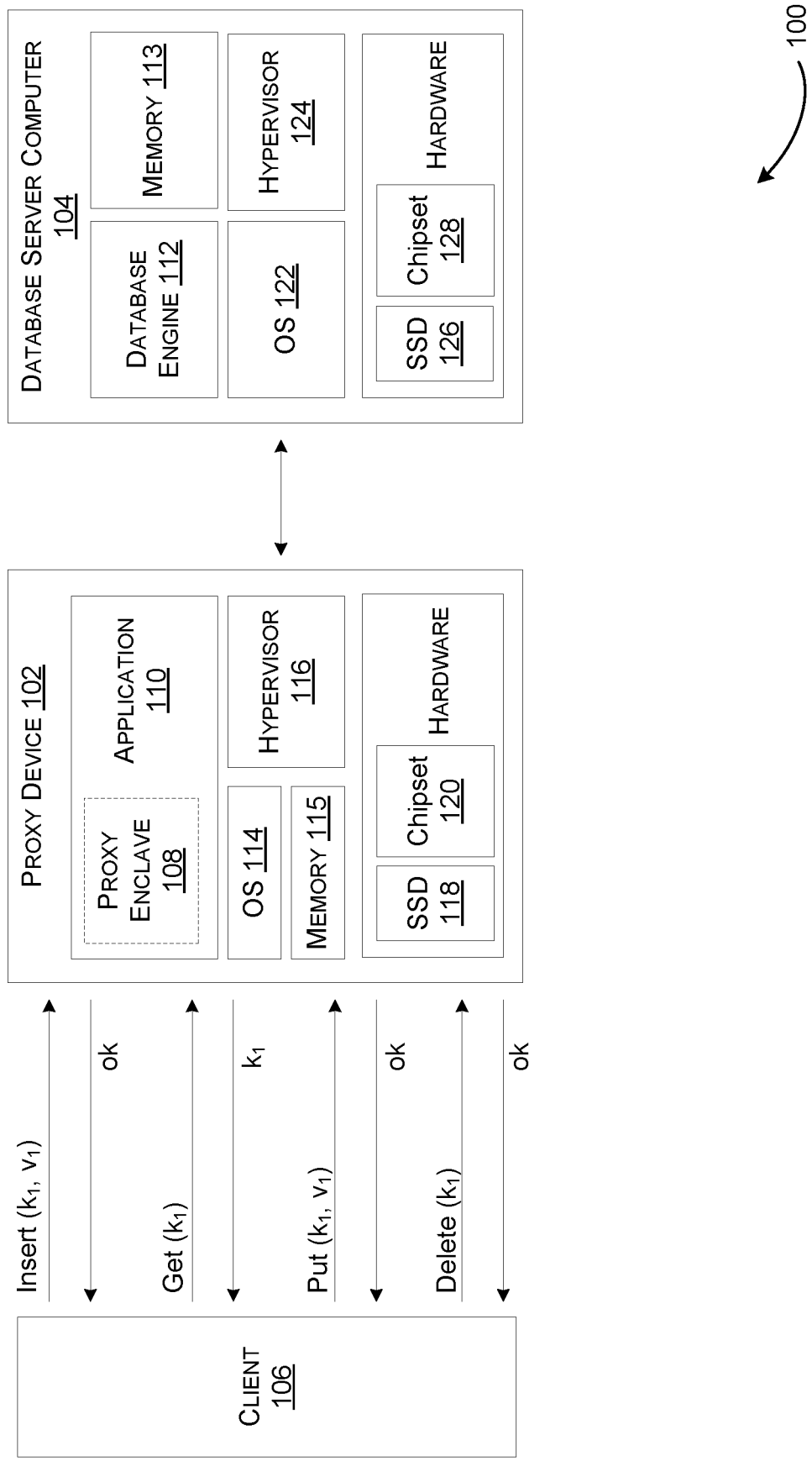
FIG. 1 illustrates an example architecture for implementing aspects of protected integrity processing according to at least one embodiment, the architecture including a proxy device and a database server.

Prior to discussing specific embodiments of the invention, some terms may be described in detail.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing client requests from one or more client computers.

A "database server computer" may be a server computer that services a database. Thus, a database server computer may process client requests from one or more client computers and transmit data in response to those client requests.

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "processor" may refer to any suitable data computation device or devices. A processor may comprise one or more microprocessors working together to accomplish a desired function. The processor may include a CPU that comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "secure memory space," also referred to as an "enclave," may be a protected region of memory (e.g., containing trusted code and data) of a device that can only be accessed by code running within the secure memory space (e.g., the enclave). A CPU of the device can monitor all memory accesses to the secure memory space to ensure that no other software (including privileged operating system(s) and/or Hypervisor layers) can access the secure memory space.

A "protected application" may refer to a software application that operates within a secure memory space of an operating device. The code and data for the protected application may be inaccessible to other software and/or hardware components of the operating device.

A "Merkle tree" may refer to a data structure (e.g., a hash tree) in which every leaf node is labelled with a hash of a data block and every non-leaf node is labelled with a cryptographic hash of the labels of its child nodes. Merkle tree(s) may allow efficient and secure verification of the contents of large data structures. A "Merkle B+-tree" is intended to refer to a Merkle tree in which any node of the tree may have two or more children nodes (rather than just two child nodes as one would find in a binary tree). In some embodiments, each node of a Merkle B+-trees discussed herein may store, at each node, any suitable combination of keys, version, presents, child hashes, and pointers to one or more child nodes.

DETAILED DESCRIPTION

While databases become increasingly omnipresent, security concerns continue to discourage outsourcing of sensitive applications to the public cloud. A database server can be compromised due to a host of reasons including vulnerabilities in the privileged software layers (operating system (OS), Hypervisor) that the database relies upon, insider attacks from malicious administrators, and bugs or misconfigurations in the database itself. Such attacks can be used to tamper or roll back (to a stale version) the contents of the data store, and eventually attack the security of the database-backed applications.

Although well-studied authenticated data structures (e.g., Merkle hash trees) can counter such attacks, their use brings about prohibitive performance overheads. These overheads are even more apparent given that modern databases provide ever-increasing throughputs. A low-overhead solution for integrity remains an open research problem.

Processor vendors now ship CPUs with hardware primitives (e.g., secure memory spaces), such as Intel SGX enclaves, for isolating sensitive code and data within protected memory regions. These enclaves are inaccessible to all other software running on the machine. In the embodiments described herein, such enclaves may be the only trusted (and relatively tiny) components of an application.

I. Overview

To address the problems described above, embodiments can include a proxy that mediates communication between a client and an untrusted database server, which may include a database engine (e.g., Redis, RocksDB, etc.). In some embodiments, the proxy may execute in whole, or in part, on the untrusted database server. The proxy may transform each client request before forwarding to the server and check the correctness of the server's response before forwarding the response to the client. The proxy can utilize a secure memory space (e.g., one or more Intel SGX enclave(s)) for isolating sensitive code and data within protected memory regions, which are inaccessible to all other software running on the machine. Since the proxy is trusted, the protections of these secure memory spaces (e.g., Intel SGX enclaves) may be utilized to host the proxy's code and trusted state. For performing integrity checks efficiently, the proxy may maintain a data structure (e.g., a Merkle B+-tree) to make efficient use of the secure memory space, which may provide a small protected memory, direct access to the larger unprotected DRAM, and CPU parallelism. Several optimizations may be implemented based on caching and concurrency, and on standard benchmarks.

A. Secure Memory Spaces (Enclaves)

Hardware support for isolated execution enables development of applications that protect their code and data even while running on a compromised host. These isolated execution environments may include secure memory spaces (e.g., enclaves) that are isolated from all other software in the system. One example of a secure memory space is an Intel SGX enclave, although any suitable secure memory space may be utilized. As discussed above, a "secure memory space," also referred to as an "enclave" may be a protected region of memory (e.g., containing trusted code and data) that can only be accessed by code running within the enclave. The CPU can monitor all memory accesses to ensure that no other software (including privileged OS and Hypervisor layers) can access the enclave's memory.

An enclave may be launched by an application, where it occupies a contiguous range of the application's virtual address space and runs with user-level privileges (e.g., ring 3 in x86). The application can invoke code inside an enclave via a statically defined entry-point, and the enclave code can transfer control back via an exit instruction executed by the chipset processor. Additionally, instructions for performing hash-based measurement and attestation of the enclave's initial memory may be executed, thereby enabling the detection of malicious modifications to the enclave's code or initial state. In some embodiments, the enclave may be utilized to protect the trusted proxy's code and state.

Since an operating system cannot be trusted to access enclave's memory safely, the CPU may prevent enclave code from issuing system calls. However, the enclave can directly access the application's memory (but not the other way around), which enables efficient input and output between the enclave and the external world. In this manner, system calls may effectively be processed by the application. Conventional hardware (e.g., chipset processors) may provide limited memory within an enclave (e.g., 96 MB). Techniques disclosed herein can demonstrate an efficient design and optimization despite such memory limitations.

B. System Architecture

FIG. 1 illustrates an example architecture 100 for implementing aspects of protected integrity processing according to at least one embodiment. As shown, the architecture includes a proxy device 102 and a database server computer 104 (e.g. Redis). Architecture 100 may extend a traditional client-server architecture with a proxy enclave 108 (e.g., a trusted environment protected using Intel SGX), which may intercept all operations (e.g., data requests) issued by a client (e.g., client 106) via a network interface of the proxy device 102. The proxy enclave 108 may intercept all responses from the database server computer 104 in order to check integrity of the responses. In this case, the application 110 (which hosts the proxy enclave 108) may manage untrusted tasks, such as socket communication with the database server computer 104. The bulk of the application 110 may be primarily implemented by a driver (e.g. Postgres driver, hiredis library, etc.). The application 110 may also include and/or manage one or more network interfaces of the proxy device 102 which may be utilized to receive client requests from a client 106 and transmit responses from the database server computer 104 to the client 106.

The database server computer 104 can be hosted on any untrusted machine, and the proxy enclave 108 may be hosted by the application 110 on proxy device 102. In some embodiments, the application 110 and proxy enclave 108 may be co-located with the client 106 or the database server computer 104 so long as a chipset of the client 106 or database server computer 104 is configured to manage secure memory spaces (e.g., an enclave). The client 106 may establish a secure transport layer security (TLS) channel with the proxy enclave 108 to protect data in transit. The client 106 may use remote attestation primitives to ensure that the proxy device 102 is genuine (e.g., hosting proxy enclave 108) before establishing the TLS channel.

In at least one embodiment, the proxy device 102 may further include an operating system (OS) 114, a hypervisor 116, a solid state drive (SSD) 118, and chipset 120. Similarly, the database server computer 104 may include an OS 122, a hypervisor 124, an SSD 126, and chipset 128.

Utilizing the configuration illustrated in FIG. 1 require no modifications to the client (e.g., the client 106) or the server (e.g., the database server computer 104). This may be especially beneficial given that new database engines are developed regularly in industry and clients may be resource constrained. The proxy device 102 may include the following components: enclave-resident code for performing integrity checks, unprotected memory 115 (containing a Merkle-tree), and an enclave-resident state (for authenticating the Merkle-tree and other security bookkeeping). It should be appreciated that it may not be possible to store the entirety of proxy's state in enclave memory (which would make integrity checks extremely efficient) because, for any database of reasonable size, the required memory is significantly larger than the 96 MB enclave memory offered on current generation CPUs. Further, given the embodiments described herein, storing the entirety of the proxy's state is not necessary to perform integrity checks.

The proxy device 102 (also referred to as the "proxy") described herein may provide standard operations of a database. In some embodiments, the database may be a standard key-value store where each value (v) is associated with, a retrievable with, a key (k). Any suitable database may be utilized. However, in a database that utilizes key-value pairs, operations may include: get(k), put(k,v), insert (k,v), and delete(k). While the proxy device 102 may expose these operations (e.g., execute corresponding function calls), it may not implement them entirely. Instead, the proxy device 102 may utilize operations of the database engine 112, which may implement such operations. The database engine 112 can manage a database stored within memory 113 (e.g., untrusted memory). This may allow the proxy device 102 to leverage modern database advances to be leveraged without requiring updates to the proxy device 102. One contribution of the proxy device 102 discussed herein is to efficiently check integrity of all responses from the database server computer 104.

C. Threat Architecture

In some embodiments, the proxy places no trust in the backend server (e.g., the database server computer 104). Since the client 106 may be only generating requests, no trust is placed on them either. Thus, in some embodiments the only trusted component is the proxy device 102, which may be hardened using a trusted execution environment (e.g., Intel SGX).

The illustration of the threat model in FIG. 1 lists all the system components that may be under the attacker's control. Except the chipset 120 that runs the proxy enclave 108, the adversary may fully control all hardware in the proxy device 102, including I/O peripherals such as the disk and network. It may be assumed that the attacker is unable to physically open and manipulate the proxy enclave 108. Additionally, it may be assumed that the chipset 120 provides integrity guarantees to the protected enclave memory. The adversary may also control privileged system software, including the OS 122, hypervisor 116, and/or BIOS layers on which the database server computer 104 depends.

Such unauthorized access can be realized by a rogue datacenter administrator with root access to the database server computer 104, or a remote attacker that has exploited a vulnerability in any part of the software stack. Such a powerful attacker can snapshot or tamper the state of the database in memory and/or disk, from underneath the server's software; the attacker may also tamper with the code of the database server computer 104. The attacker can also control all I/O: it can create, modify, drop, and reorder any message between the client (e.g., the client 106), the database server computer 104, and the proxy device 102. In denial of service attacks, the database server computer 104 may choose to ignore all requests, and the attacker can destroy the entire database.

II. Problem Formation

The system described herein may provide the standard operations of a key-value store, other database applications, and/or other data retrieval operations. Some of these operations are depicted in the table 200 provided in FIG. 2. The table 200 describes integrity guarantees for each operation, based on a result type, in accordance with at least one embodiment. As depicted, the operations may include: get (k), put(k,v), insert(k,v), and delete(k). As used herein, a get(k) operation may output the value associated with a key k; put(k,v) may update the internal state to associate key k with a value v; insert(k,v) may be used to create a new association for a key k, and may fail if k already exists in the database; delete(k) may remove any associations/values for a key k from the database. In some embodiments, the system may output one of the following results for each operation: (0) success, along with a value in the case of get operations; (1) integrity violation; (2) application error (indicating incorrect use of API, such as executing a function call get(k) on non-existent key); (3) failure (due to benign reasons, such as insufficient memory). The following formalism may state the integrity property.

Definition 1 An action is a tuple (op, res), where "op"∈{get, put, insert, delete} is the requested operation and "res" is the result sent back to the client.

Definition 2 A session $\pi$ between a client and the system is a sequence of actions [($op_0$,$res_0$), . . . ], in the order the operations were issued by the client. Let $\pi[i]=(op_i, res_i)$ denote the i-th element of the session, where $\pi[i].op$ denotes $op_i$ and $\pi[i].res$ denotes $res_i$. Furthermore, $|\pi|$ denotes the number of actions in $\pi$.

A session $\pi$ may satisfy integrity if the properties listed in FIG. 2 hold for each action $\pi[i]$, where $i \in [0, \ldots, |\pi|-1]$. A database may provide integrity if it provides integrity at all times, in all sessions. As defined in FIG. 2, integrity has two main sub-properties: authenticity and freshness. Authenticity implies that a get operation returns a value that was previously written by the client (e.g., the client 106 of FIG. 1) (not fabricated by the attacker). Authenticity is stated implicitly because all properties in FIG. 2 refer to previous actions in the session, and ensure that the results are a deterministic function of the previous operations issued in that session. Freshness implies that a get operation returns the latest value written by the client (thus preventing rollback attacks), and that the set of keys in the database at any time is a deterministic function of the most up-to-date history of client's operations (i.e., the attacker does not insert or delete keys). Freshness may be stated explicitly in the property for get in FIG. 2, which stipulates that the returned value must originate from the most-recent put, and that the results of insert and delete operations are consistent with the history of operations in that session—for instance, an insert(k,v) may only succeed if the key k does not exist. The results with error messages may also have authenticity and freshness requirements.

The system disclosed herein enforces the properties provided in FIG. 2 for each operation, even in the presence an error-ridden and/or compromised back-end database server. When the system detects an integrity violation (e.g. tampering to the database), the proxy device 102 may stop accepting new requests and may terminate the session. It should be appreciated that while examples herein may be directed to a single client setting, these examples can be easily extended to multiple clients since the operations of proxy device 102 are agnostic to the number of clients that it serves. In examples in which multiple clients are utilized, an ordering may be defined by the order in which operations arrive at a message queue of the proxy device 102, and requests may be processed by pulling requests from the message queue.

III. Integrity Verification

Integrity may be composed of authenticity and freshness guarantees, and the system disclosed herein may use the proxy device 102 of FIG. 1 to enforce both. Authenticity may be enforced using a cryptographic MAC, and freshness using enclave-resident state for keeping track of versions (discussed in further detail below). In some embodiments, a Merkle-tree data structure may be utilized to provide integrity checks.

A. Basic Design

Returning to the architecture 100, to commence a session with the proxy (e.g., the proxy device 102 of FIG. 1), a client (e.g., the client 106) may first establish a TLS channel with the remote endpoint in the proxy enclave 108. The channel establishment protocol may use, for example, an authenticated Diffie-Hellman key exchange, where the proxy's message is signed using the SGX CPU's attestation primitive. For example, the chipset 120 may compute a hash-based measurement of the proxy enclave 108 as it is being loaded into memory, and this hash may be included in the signature, thus allowing the client to verify the genuineness of the proxy enclave 108. The client (e.g., client 106) may issue get, put, insert, and delete operations over this TLS channel by serializing the API opcode and operands, and then encrypting them using cipher (e.g., an AES-GCM cipher). It may be assumed that the database server computer 104 supports these operations as well.

To perform the integrity checks, the proxy device 102 may maintain an encryption key (e.g., a 128-bit AES-GCM key) for encrypting communication with the client(s), an authentication key (e.g., a 128-bit HMAC key) for authenticating server-bound values, a "version" map (herein referred to as a "version") of keys of the database to counters (e.g., 64-bit counters) for maintaining current versions of each versioned updates to each database key; 3) a "present" map (herein referred to as a "present") of keys to Boolean values for tracking the set of keys that are present in the database. For the purpose of illustration, it can be assumed that all of the proxy's state information is stored within proxy enclave 108, along with its code. Storing version counters for each key in the database can lead to increased space overhead. Alternatives for ensuring freshness include storing a pre-image resistant digest, such as a cryptographic hash, of the stored value, or storing the entire value itself. In some embodiments, a map may be utilized, in lieu of simply adding/removing entries from the version map. The integrity checks and the proxy-server interactions may now be described.

1. Put Operations

The proxy device 102 (e.g., utilizing application 110) may, among other things, transform the arguments of a put(k,v) request before forwarding the request to the database server computer 104. First, the proxy device 102 may return an error (e.g., a key_missing_error) if the proxy device 102 does not maintain a binding for key k. Otherwise, the proxy device 102 may compute an HMAC to authenticate the payload of the request, where the HMAC binds the value v and a new version counter to the key k. The database server computer 104 may choose to deny the put request, in which case a failure message may returned to the requesting client 106; otherwise, the proxy device 102 (e.g., utilizing application 110) may acknowledge the successful operation by incrementing version[k]. This may be described in code below.

```
C if (present[k])
{
    tag := HMAC(hmac_key, k || version[k] + 1 || v)
    res := server.put(k, version[k] + 1 || v || tag)
    if (res == ok)
    {
        version[k] := version[k] + 1
    }
    else
    {
        return res
    }
}
else
{
    return key_missing_error
}
```

2. Get Operations

The proxy device 102 may forward a get(k) request to the database server computer 104 if a binding for key k is known. Otherwise, the proxy device 102 (e.g., utilizing the application 110) may return a key_missing_error to the requesting client (e.g., client 106). The payload returned by the database server computer 104 may be checked for authenticity using an HMAC, which may be computed over the requested key k, version counter ctr, and the value v. If the payload is deemed authentic (which proves that it was previously emitted by the proxy device 102), the proxy device 102 may proceed to check that the counter (ctr) matches the value in a local state version, which may guarantee freshness. These operations may be described in code below.

```
C if (present[k])
{
    res := server.get(k)
    if (res == fail) { return fail }
    ctr || v || tag <- res /* deconstruct payload */
    /* failure of following assertions causes halt */
    assert tag == HMAC(hmac_key, k || ctr || v)
    assert ctr == version[k]
    return (ok, v)
}
else
{
    return key_missing_error
}
```

3. Insert Operations

An insert(k,v) operation may be handled similarly to put(k,v), except that the proxy device 102 may create a new binding for key k in the version and present maps. While one might expect that a new binding should initialize with the counter value 0, this scheme would not defend against the following attack. Consider a session where the client deletes a key and later inserts it again, i.e., a session of the form [ . . . , insert(k,v), delete(k), . . . , insert(k,v'), . . . ]. If the version counter were to reset to 0 on the insert(k, v') operation, then the attacker can start supplying older values from the session but still satisfy the integrity checks. To prevent this attack, the system may check whether the key k was previously inserted, and resume the counter. This is ascertained by checking for the presence of k in version, but with present[k] set to false. These operations are described below in code.

```
C if (present[k])
{
    return key_present_error
}
else
{
    ctr := k in version ? version[k] + 1 : 0
    tag <- HMAC(hmac_key, k || ctr || v)
    res <- server.insert(k, ctr || v || tag)
    if (res == ok)
    {
        version[k], present[k] := ctr, true
    }
    return res
}
```

4. Delete Operations

In delete operations, the proxy device 102 may forward the delete command to the database server computer 104. If the database server computer 104 deletes successfully, the binding may be removed by setting present[k] to false. In some embodiment, the counter version[k] may be retained for the purpose explained above.

```
C if (present[k])
{
    res <- server.delete(k)
    if (res == fail) { return fail }
    present[k] := false
}
else
{
    return key_missing_error
}
```

B. Merkle B+-Tree and Operations

The security of the system may rest on being able to perform the integrity checks securely. Accordingly, a protected memory (e.g., the proxy enclave 108) may be utilized to store the proxy's code and data. As described above, the proxy's state may include the version and present maps (which may require 65 bits for each key, in some cases, a 64-bit counter and 1 bit for the present flag though the counter's bit width may be adjusted). Therefore, the state information of proxy device 102 may grow with the size of the database (or more accurately, the number of keys). It may be the case that some CPUs only offer a constant-size secure memory space (e.g., an enclave of 96 MB) or a secure memory space with an threshold size limit (e.g., 96 MB). In these cases, for any database of reasonable size, the proxy enclave 108 may be exhausted relatively quickly.

One solution is to utilize secure paging, which allows for larger than 96 MB enclaves, relying on the OS and CPU to co-operate together on page-level management of enclave memory (e.g., the proxy enclave 108). In one example, the CPU may automatically encrypt pages (e.g., 4 kb pages) that are swapped out to non-enclave memory, and decrypt the requested page before loading it into the proxy enclave 108. This may preserve both integrity and authenticity of the state information of the proxy device 102 because, while the OS 114 learns access patterns and controls resource allocation, it is unable to tamper or observe the plaintext contents of those pages. However, this approach has two notable drawbacks. First, paging incurs a significant overhead as accessing even 1 bit from the present map incurs encrypting 4 KB of data, followed by decrypting and storing another 4 KB to memory. Second, although larger enclaves may be instantiated, this approach may require the system to commit to the maximum size of the enclave statically, which could cause the proxy device 102 to crash once the database approaches a threshold size.

Figure 3:
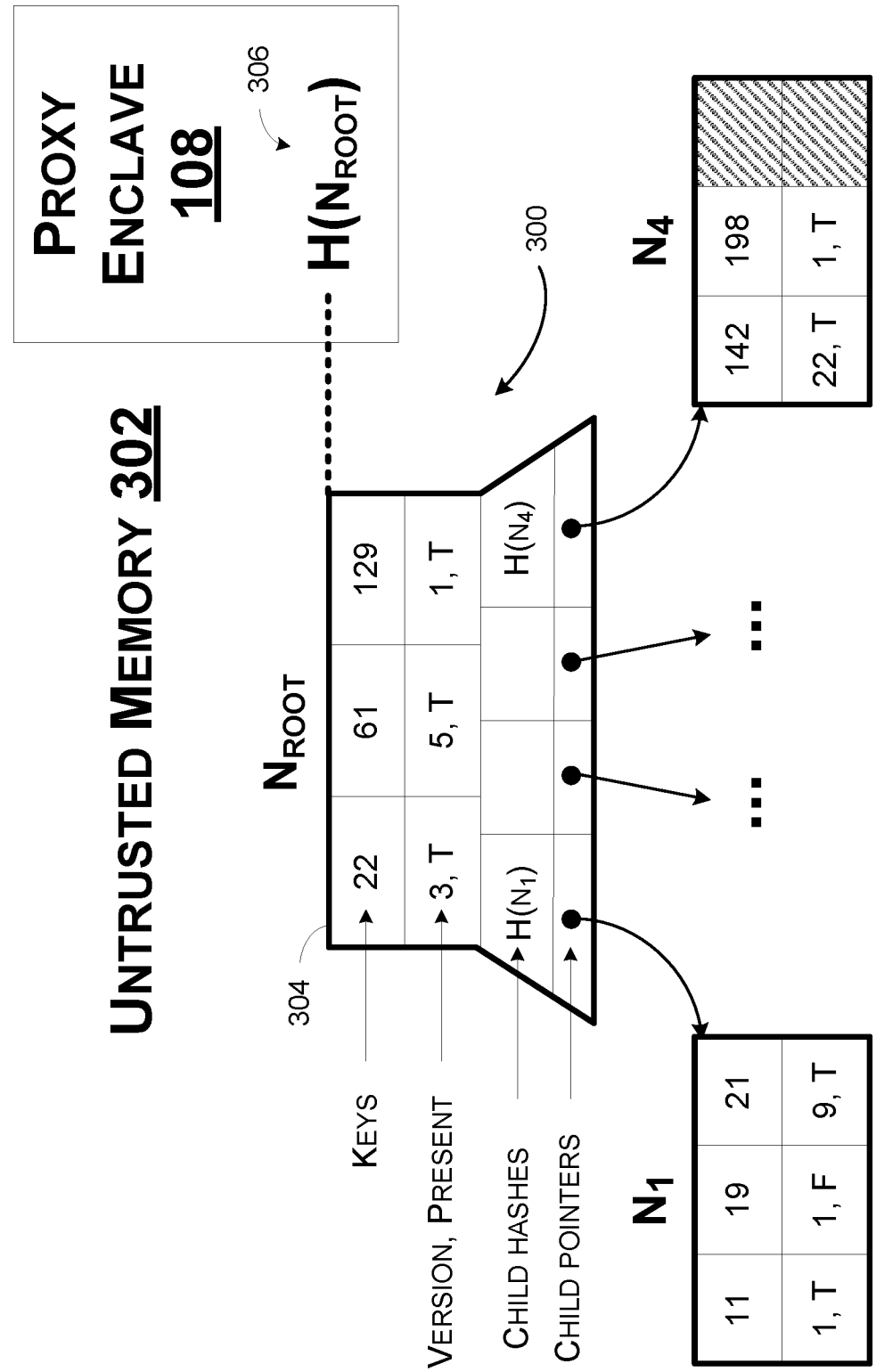
FIG. 3 illustrates a data structure (e.g., a Merkle B+-Tree) for authenticating version and present where the root node may be stored in protected memory (e.g., an enclave), according to some embodiments.

Instead, a more practical and standard approach for such situation may be to employ an authenticated hash map, such as a Merkle-tree, which stores a relatively small digest in trusted memory (e.g., the proxy enclave 108) and uses untrusted storage to hold the contents of the map. The system may employ a Merkle B+-(MB) tree, which offers logarithmic time update and retrieval operations. FIG. 3 illustrates a data structure 300 (e.g., a Merkle B+-Tree) for authenticating version and present for a sample database, where the root node may be stored in a secure memory space (e.g., the proxy enclave 108), according to some embodiments.

As depicted in FIG. 3, each node (e.g., $N_{root}$, $N_1$-$N_4$, etc.) contains several keys, a version counter and present bit per key, pointers to child nodes, and a hash of each child node. A node's hash may be computed using a cryptographic hash algorithm (e.g., a SHA-256 function) applied to the concatenation of the following contents: keys, version and present bits, and hashes of child nodes. It should be appreciated that child pointers may not be included while computing the hash. One reason such pointers may not be included is that the hash is intended to be a concise digest of the contents of the subtree. As per the properties of a MB tree, the left child relative to any key k may hold those keys that are strictly less than k, while the right child relative to any key k may hold those keys that are strictly greater than k. A leaf node may not contain any child pointers or hashes. The entire tree may be stored in untrusted memory 302 (e.g., an example of memory 113 of FIG. 1), while the proxy enclave 108 stores the hash of the root node 304 (e.g., hash 306). The hash 306 may be updated on each update to the tree (put, insert, and delete operations). With the introduction of the MB-tree, integrity checks may be modified as follows.

1. Get Operations

The algorithms presented above assumed trusted access to version[k] and present[k]. Since this state is stored in the MB-tree in unprotected memory, the algorithm for get(k) discussed above may be prepended with the following steps to ensure authentic reads.

```
C path := search(n_root, k) /* path from root to node with k */
trusted_hash := H(n_root) /* stored in proxy enclave 108 */
for (i = 0; i < path.length - 1; i++)
{
    cp(n_local, path[i]) /* memcpy node to proxy enclave 108 */
    assert H(n_local) == trusted_hash /* authenticate */
    j := find(path[i+1], n_local) /* index of child */
    trusted_hash := n_local.child_hash[j]
    j := find(k, n_local) /* index of k in keys */
    version[k] := n_local.version[j] /* authenticated */
    present[k] := n_local.present[j] /* authenticated */...
}
```

A path from the root node down to the node containing k may be determined, while authenticating each node to determine the trusted hash of the next child node. The trusted root node hash (e.g., $H(n_{root})$, hash 306) may bootstrap this process. This process may copy nodes to enclave memory (e.g., the proxy enclave 108 of FIG. 3) and may compute hashes for a logarithmic number of nodes, from the root node until the node containing key k. This may add significant overhead. Additional methods are disclosed herein directed to a set of optimizations for reducing this overhead.

2. Put, Insert, and Delete

In some embodiments, updates to the MB tree may cause the updated hashes to propagate all the way to the root, modifying each node along the path. A put(k,v) operation may increment version[k] while a delete(k) operation may update present[k]. For both these operations, the MB tree may be searched for the node containing k, and the same logic may be used as get (shown above) to attain the contents of that node. Next, the node may be updated, which may necessitate updating the hash of that node (in the parent), and the hashes of predecessor nodes up to the root. For this reason, update operations may be slower than get operations.

An insert(k,v) operation may create a new entry in the MB-Tree, which may either be placed in an empty slot in an existing node or placed in a newly allocated node—the latter may cause a change in the structure of the MB tree. In either case, a path may be authenticated in the tree and the hashes updated after the insert, similar to put and delete operations.

C. Optimizations

FIG. 4 may illustrate two cache structures that may be used in several optimizations for lowering overhead related to the utilization of Merkle B+-trees.

First, the system may realize a significant performance improvement by using a secure memory space (e.g., the proxy enclave 108), which provides direct access to untrusted memory 302 from trusted enclave code. However, overhead processing may be significantly worse than in the example discussed above, where nodes along a path in the MB Tree are sent by the untrusted server to the client-side verifier over the network.

Three optimizations may be discussed below including caching, concurrency, and compression.

1. Caching (Hash Cache and Value Cache)

A secure memory space (e.g., the proxy enclave 108 which includes enclave memory 402) may offer significantly more protected memory then what is needed to implement the system discussed herein. Thus, in some embodiments, a portion of the enclave memory 402 may be dedicated to cache a state of the MB-tree, in addition to the mandatory storage of the root node hash $H(n_{root})$. By caching this state, computing hashes to authenticate reads of that state may be avoided, and ultimately such caching may improve both latency and throughput. The system may reserve a portion of enclave memory for two caches: 1) a hash cache 404 for caching child node hashes, and 2) a value cache 406 for caching version and present bits. By utilizing the hash cache 404 and the value cache 406 the system may optimize performance across different workloads. For example, skewed workloads may benefit more from the value cache 406, while the hash cache 404 may benefit workloads with higher entropy distributions such as uniformly random.

As depicted in FIG. 4, a hash-cache may cache hashes of a subset of nodes within the MB-tree 408. Because the enclave is trusted, a cached node's hash may be considered to be both authentic and fresh, which may obviate computing hashes of its predecessors in order to authenticate that node's contents.

For a cache of size n, an ideal cache may the top n most frequently accessed items, assuming that past behavior is a prediction for future behavior. The system may use an approximate heavy-hitters algorithm based on weighted count-min-sketch (CMS) to determine the most frequently accessed nodes. Furthermore, for adaptability, windowing may be utilized to ensure that the cache adapts to changing behavior. The hash-cache may be indexed by the memory address of a MB-tree node, and may store the hash of that node. In some embodiments, both the hash cache 404 and the value cache 406 may be implemented using a cuckoo hash table (with 4 buckets) with fixed space allocation (i.e., no resizing).

In some embodiments, some of enclave memory 402 may be dedicated to the value cache 406 which may include entries of the version and present maps, which may obviate computing any hashes to authenticate their values. A cache replacement policy may be utilized for the value-cache for skewed workloads. In some embodiments, value cache 406 may be indexed by a key, and may store a version counter and present bit.

2. Concurrency

The integrity verification logic in the disclosed system may be CPU bound, as it comprises computing a sequence of hashes along with an HMAC. Accordingly, in some embodiments, multiple CPU threads may be utilized within an enclave (e.g., the proxy enclave 108), and such hardware parallelism may be leveraged to improve throughput.

Some clients may be concerned with sequential consistency. Accordingly, a message queue can be utilized to accept API requests from the clients (e.g., the client 106 of FIG. 1) via a network interface, and launch multiple threads that concurrently process requests from the queue. In situations in which there may be a read-write and write-write conflict at the root of the MB-tree, update operations may modify the root and all operations read the root and locking may be introduced to avoid data races. These conflicts could also exist at intermediate nodes since they may also be accessed. However, the performance impact of locking may be costly, and the complexity of various optimizations discussed below may speed up this approach. One such optimization is to couple the caching optimization with concurrency control, by introducing a lock for each node in the hash-cache, which has the potential to enable more concurrency. In some embodiments, update operations only modify the hashes in the hash cache 404, and the modified hashes may be provided to the MB-tree 408 in untrusted memory 410 only when nodes are evicted from the hash cache 404. However, this design can become increasingly complex due to the following reasons: 1) insert and delete operations create structural changes, which necessitate updates to both the hash cache 404 and the MB-tree 408; 2) locking is not avoided on the MB-tree 408 since conflicts must be prevented when flushing updates in the event of cache eviction; and so on.

In some embodiments, a simpler approach may be employed. This approach includes sharding the version and present maps into separate maps, and building a separate MB-tree for each shard. Assignment of keys to shards may be done using a fast hash function (e.g. crc32). Sharding of the state and building an MB-tree for each shard effectively results in a Merkle forest, i.e., a set of disjoint trees. An integrity verification thread may be launched for each shard. With this design, there may be no shared state across threads, removing the need for any form of locking. Furthermore, the system disclosed herein may implement an asynchronous I/O mechanism within the enclave memory 402 to allow the threads to operate without context switching from enclave mode to untrusted code. These details may be discussed further below.

Figure 5:
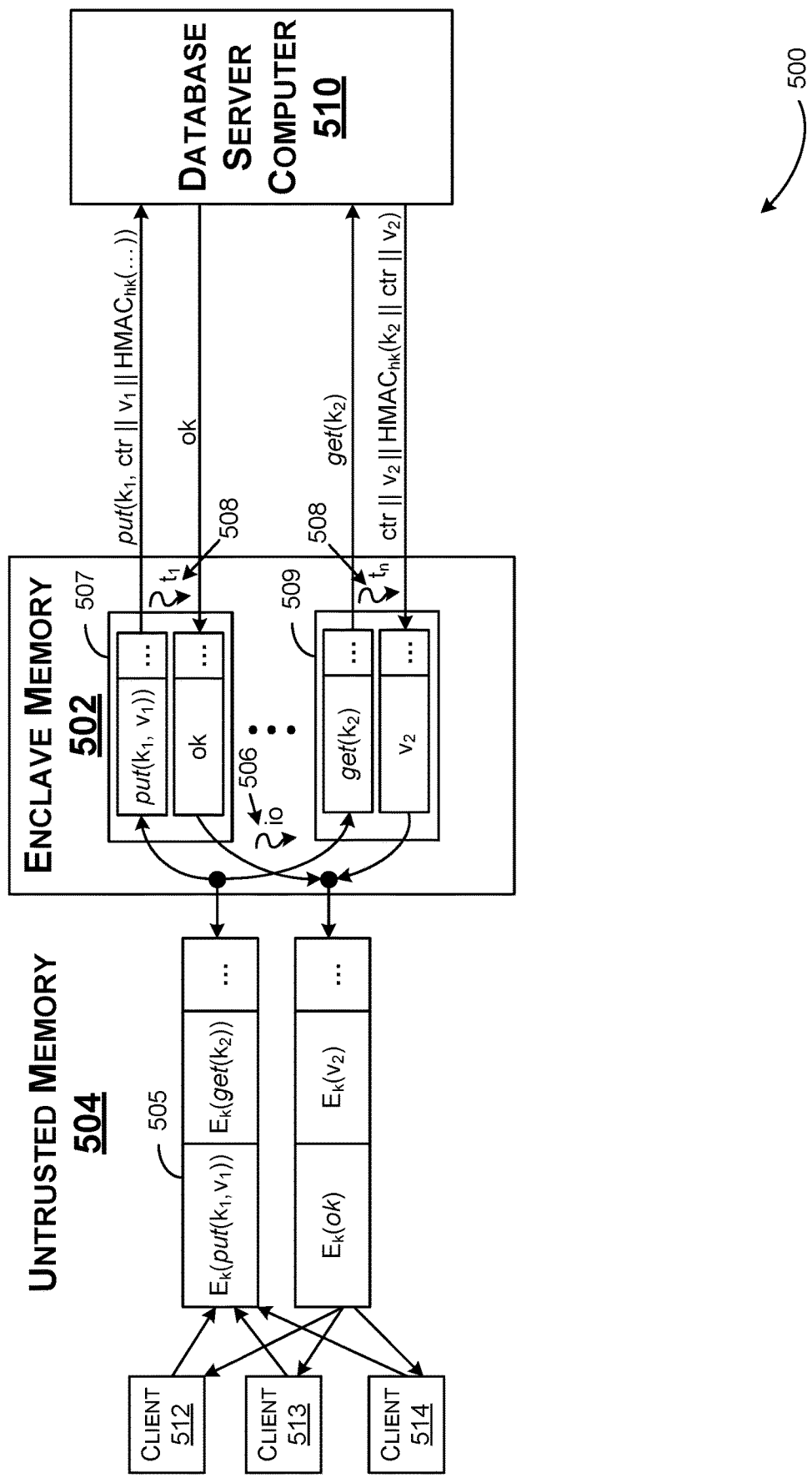
FIG. 5 illustrates two cache structures, in accordance with at least one embodiment.

As depicted in FIG. 5, message queue(s) 505 may be instantiated in untrusted memory for accepting encrypted and/or unencrypted data requests (also referred to as "client requests"). The message queue(s) 505 may be managed by a distributed messaging library. Within a proxy enclave (e.g., enclave memory 502, an examples of the proxy enclave 108 of FIG. 1), a dedicated I/O thread 506 may be employed to handle all input and/or output to/from the enclave memory 502, and a set of worker threads 508 (marked $t_1, \ldots, t_n$ in FIG. 5, one for each shard) may perform integrity checks and issue commands to the database server computer 510 (e.g., the database server computer 104 of FIG. 1). The dedicated I/O thread 506 may encrypt requests the message queue(s) 505, decrypt them using a TLS session key, and copy them into an in-enclave input buffer (e.g., input buffer 507, input buffer 509, etc.) of one of the worker threads. Each worker thread may fetch the next request from its corresponding input buffer. To fulfill each client request, the worker may issue a request to the database server computer 510. The worker thread may serialize the operands to non-enclave memory (e.g., untrusted memory 504), where a dedicated thread in the untrusted host application interacts with the database server computer 510 (using a standard client library such as hiredis for Redis server)—and may wait for a response from database server computer 510 to be populated at a designated location in non-enclave memory (e.g., untrusted memory 504).

In addition to exploiting hardware parallelism, asynchronous I/O mechanisms employed herein may avoid unnecessary context switches across the enclave boundary. Furthermore, the use of sharding-based concurrency discussed herein does not suppress the caching and compression optimizations discussed earlier—each shard may receive an equal share of the hash-cache and the value-cache. Conventional systems do not pursue sharding because skewed workloads (where a few keys account for most of the operations) can create a load imbalance. However, the caches (e.g., the hash cache 404 and the value cache 406) discussed herein benefit skewed workloads heavily and other workloads enjoy all available parallelism due to the sharding discussed herein.

3. Compression

Within a MB-tree node (and across nodes), keys may be stored in order for efficient indexing. This creates an empirical phenomenon where keys within a node share several common bits, starting from the most significant bit. For instance, the keys within the root node may share all but the lowest 8 bits. In this case, instead of duplicating the other 248 bits of 0's (where max key length is set to 256-bit keys) three times, the common bits may be stored once. In practice, this may serve to reduce in memory footprint across benchmarks by approximately 30%.

D. Extensions

1. Key Rotation

The system disclosed herein may uses a counter (e.g., a 64-bit counter) for each key in a version map, although this configuration can be altered. After some duration, this counter may overflow (back to 0), which would allow an attacker the ability to supply stale values, with the same counter as the current value within the version map, and yet pass the integrity checks. A key rotation scheme may be implemented that pauses operation on encountering an overflow, chooses a new HMAC key at random, and re-populates the database server computer 510 with values that are authenticated under the new key. In some embodiments, this process may incur approximately 10 minutes of downtime for a database of 50 million keys, at a throughput of 100,000 operations per second.

2. Fault Tolerance

The proxy may be a single point of failure in the design described herein. Not only does the proxy's failure make the database unavailable to the client (until it restarts), but it may also prevent integrity checks on future operations because its entire state is stored in volatile memory. Some solutions are described below.

First, replication offers a standard approach for fault tolerance, where the proxy service is distributed onto a cluster of nodes (e.g., in a primary-replica (leader-follower)) setup. In these cases, the clients connect to a primary node, which propagates all update operations (put, insert and delete) to the replica nodes so that they can update their local state. In the event of failure of the primary node, the client (or some intermediate hop) establishes the connection with a replica node, which becomes the new primary node. To avoid round-trip communication between the primary and replica nodes, a distributed messaging system (such as Kafka) may be used to allow the primary node to "fire and forget", and also allow the replica nodes to recover from their failures. Next, to avoid loss of state on failure, the proxy's state may be periodically stored to persistent storage.

IV. Implementation

The system disclosed here may be implemented as a network service that acts as a proxy between the client (e.g., the client(s) 512 of FIG. 5 which are examples of the client 106 of FIG. 1) and the server (e.g., the database server computer 510 of FIG. 5), and can be deployed on any machine with an Intel SGX CPU (which could be co-located with the client or the server). The proxy's code comprises of an untrusted component (that interacts with the clients 512-514 and the database server computer 510) and a trusted component (that implements the integrity checks).

The trusted enclave may implement the integrity verification logic described herein, and a minimal TLS layer may establish a secure channel with the clients 512-514. The TLS channel may be established using a Diffie-Hellman key exchange that is authenticated using a remote attestation primitive, which can produce a hardware-signed quote containing the enclave's identity that the clients can verify to ensure the genuineness of the proxy enclave.

The untrusted component (e.g., the application 110 of FIG. 1)) may implement I/O between the clients and the proxy enclave, and between the proxy enclave and the database server. The client-proxy I/O can be implemented using a mainstream asynchronous messaging library (e.g., ZeroMQ). The proxy-server I/O may be implemented using a thin wrapper over a database client library (e.g., hiredis). At least some of the untrusted component (e.g., the application 110) is executed outside of an enclave (e.g., enclave memory 502 of FIG. 5, proxy enclave 108 of FIG. 1). This may be because socket-based communication invokes system calls, and the OS cannot be trusted to modify enclave memory 502.

V. Evaluation

Using transaction data (e.g., payment transaction data for financial transactions) and standard benchmarks, the system may be evaluated by studying the following questions:
How much overhead in space (i.e., memory footprint) and time (i.e., impact on throughput and latency) does integrity checking add, in comparison to the off-the-shelf system? How does the system's performance compare to alternate approaches that provide the same security guarantee?
How does this overhead depend on the size of the database and running time?
How much improvement do the optimizations (described above) give? How does performance vary with parameters such as cache sizes and available parallelism?

A. Experiment Setup

The system may be implemented as a network service proxy on the path between a client and an untrusted database server. Since including network latencies while measuring latency can suppress the overhead metrics, the client, proxy, and the server may be run on the same machine (with sufficient hardware parallelism). Furthermore, to measure throughput, a multi-threaded client may be utilized to flood the proxy with requests so as to prevent the proxy from stalling—each client thread issues operations synchronously, i.e., waits for the response from the proxy before issuing the next operation.

The system may be evaluated with the YCSB benchmark and in a practical setting (e.g., at a payment processing provider such as VISA to process payment transactions). The tests may be conducted using the following YCSB workloads: A (50% gets and 50% puts), B (95% gets and 5% puts), and C (100% gets), and D (95% gets and 5% inserts). For each workload, a setup phase may be run where a number of keys (N E {1 million, 10 million, 50 million} are inserted into a database. During measurement, each operation accesses one of these keys, where the keys are generated using either the scrambled Zipfian distribution ($\alpha$=0.99) or Uniform distribution; for workload D, the insert operations generate new keys that do not exist in the database. The workload may capture access patterns to a key-value store encountered while processing data (e.g., payment transactions) during a period of several weeks, amassing over two billion operations—each transaction incurs one get operation to the database of lost/stolen cards in order to check for fraudulent transactions.

B. Measuring Space and Time Overload

The impacts of integrity checks in the system may be measured on both throughput and latency, using the 4 YCSB benchmarks and the test data. For each YCSB workload, the experiment may be conducted with both the Zipfian distribution and a Uniform distribution. The database size may be fixed to 1 million keys, where each key is 32 bytes and each value is of length between 16 bytes and 256 bytes (chosen randomly). While the system can work with any key-value store back-end, RocksDB was utilized to conduct such experiments.

1. Throughput and Latency

Figure 6:
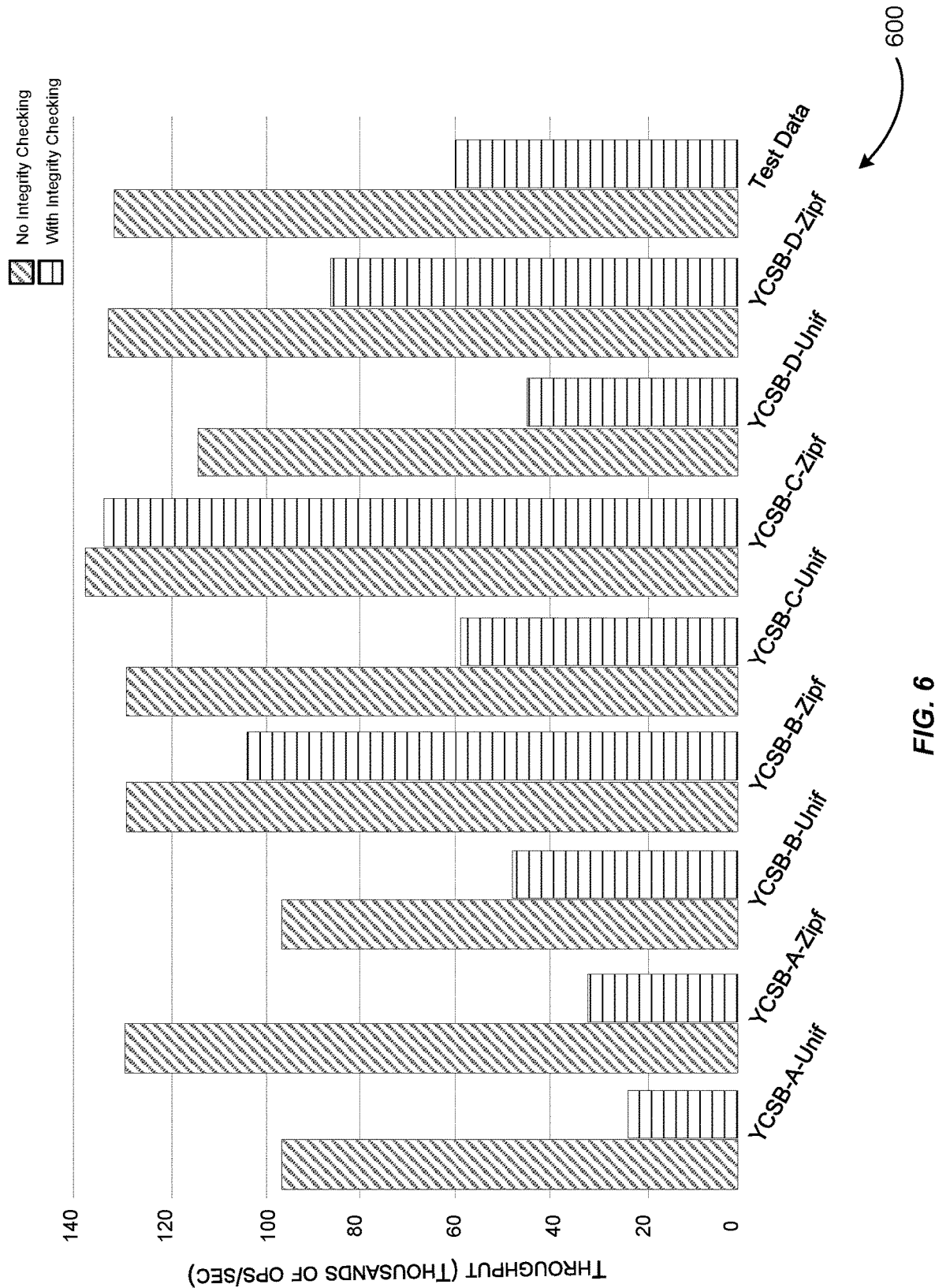
FIG. 6 illustrates a graph that describes throughput measurement with one thread (with caching)
Figure 7:
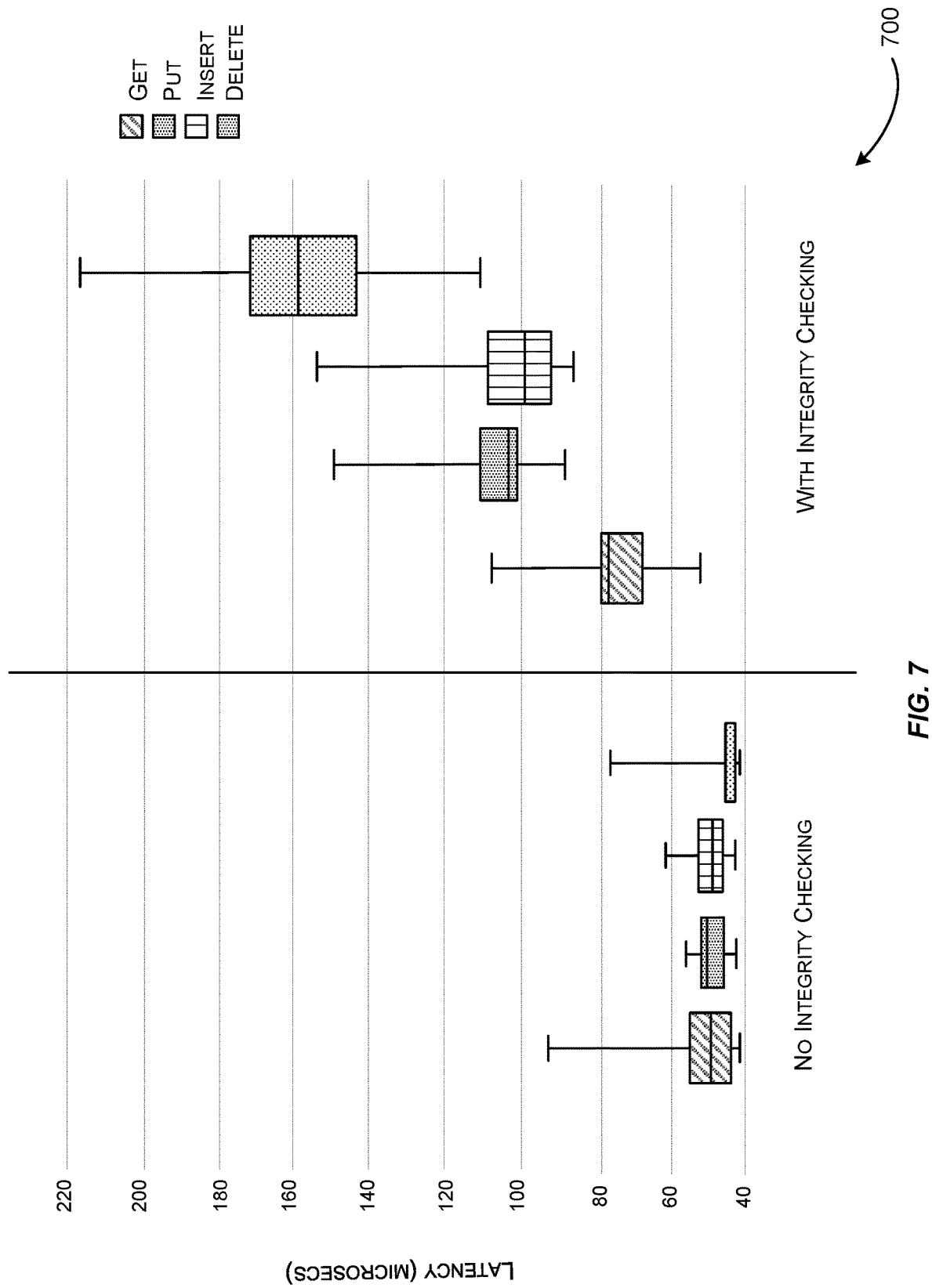
FIG. 7 illustrates a graph that describes latency measurements with one thread (with caching)

FIG. 6 illustrates the throughput measurements across all benchmarks, and FIG. 7 illustrates the latency overheads for each operation.

As expected, it is clear using the system discussed herein that get operations execute significantly faster than others, leading to lower latency and higher throughputs, due to the primary reason that get operations incur no updates to the MB tree. For a get operation, hash computations are only required to ensure the integrity of the read nodes along the path from the deepest cached node (or root node if caching is disabled) to the node holding the requested key. All other operations may update the contents of one or more nodes in the MB tree. Therefore, in addition to ensuring the integrity of the read nodes (as done in get operations), hashes may need to recomputed for the updated nodes, and the updates provided for each node all the way up to the root node; this may increase the computational overhead of these operations. This phenomena is evident in FIG. 6, where the proportion of get operations progressively increases from 50% in YCSB-A to 100% YCSB-C, leading to higher performance; FIG. 7 also supports this phenomena as get operations lead to significantly lower latency.

The system discussed herein provides significantly higher throughput with Zipfian distributed workloads because only a small set of keys account for a large fraction of the accesses, which lends well to caching—approximately 50 keys account for over 99% cumulative probability. This is because the hash verification can commence from the deepest cached node in the h-cache as opposed to the root of the MB tree, or the key could be present in the v-cache in which case no verification is required. This phenomenon is especially observable for get operations (see YCSB-C), since they incur no updates to the MB tree. For all other operations, the update may cause a change in the contents of one or more nodes, causing hash updates to percolate all the way up to the root node; this may suppress the effect of caching. For that reason, get requests were found to perform much better than others.

2. Memory Footprint

Figure 8:
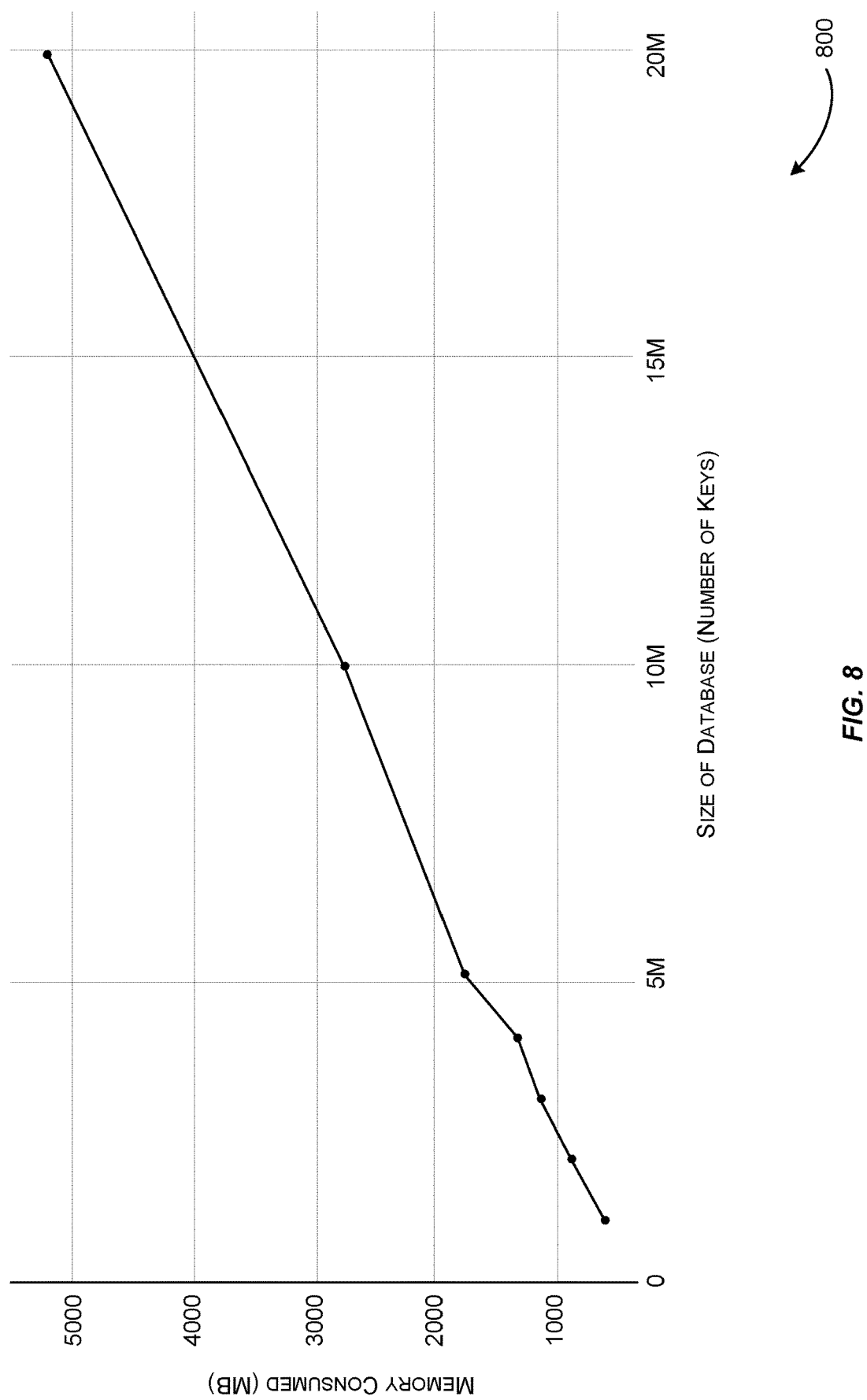
FIG. 8 illustrates a graph that describes memory consumption with respect to database size, in accordance with at least one embodiment.
Figure 9:
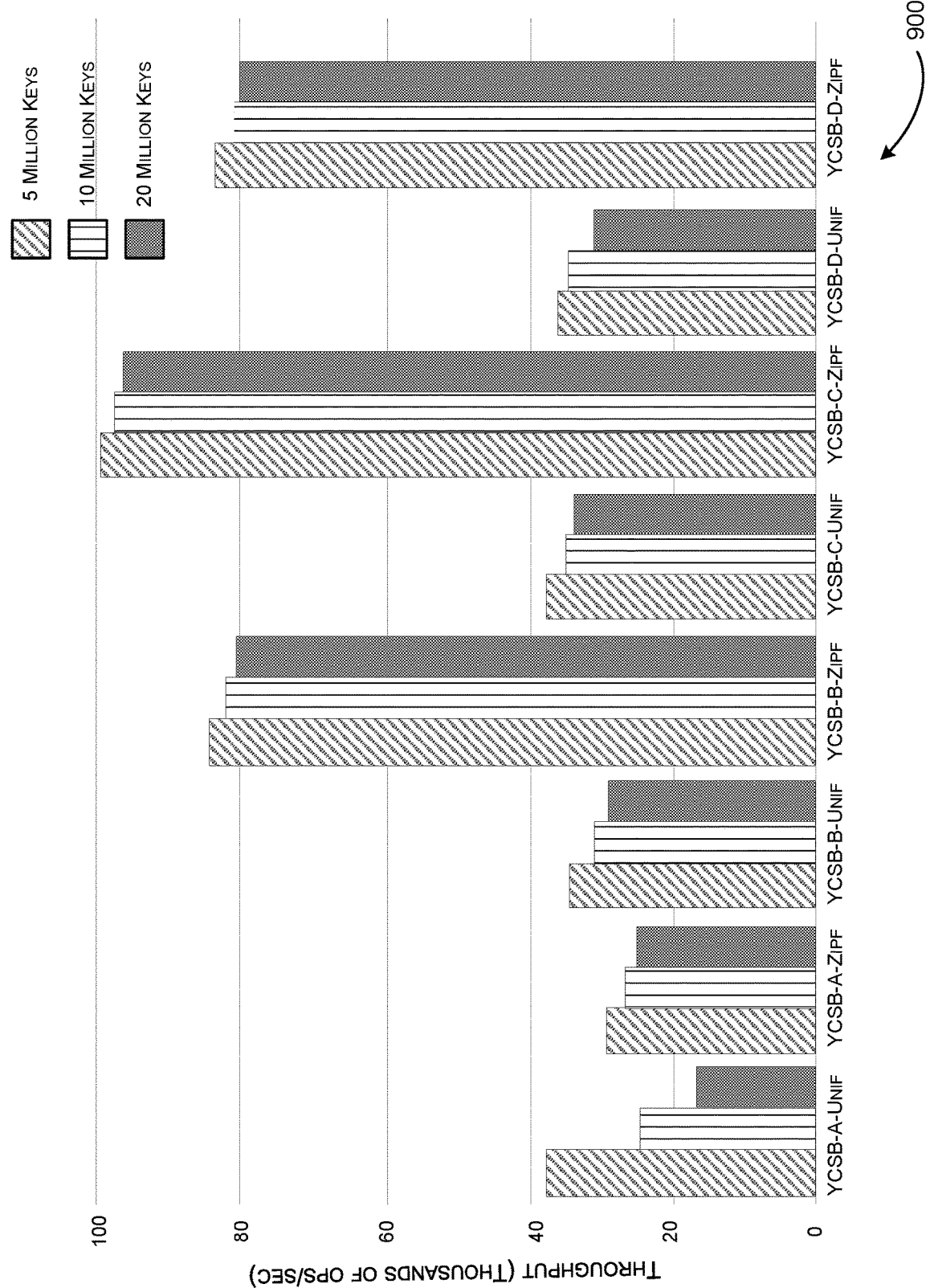
FIG. 9 illustrates a graph that describes throughput realization with respect to a set of dataset tests, in accordance with at least one embodiment.

A MB tree may store a counter (e.g., a 32-bit counter) for each key in the database. Therefore, the size of the MB tree may grow linearly with the number of keys in the database, which is illustrated in FIG. 8. The memory footprint in FIG. 8 may only capture the size of untrusted memory, which holds the entire MB tree. The space allocated to trusted memory may be constant, and is dwarfed by the size of untrusted memory—in the subject setup, approximately 90 MB was allocated, which is the maximum available protected memory in some processors (e.g., SGX processors). This 90 MB is allocated for the code of the system, stack space for use by the system code, the trusted hash of the root node, the h-cache and v-cache, and the count-min sketch table.

VI. System Architecture

Figure 10:
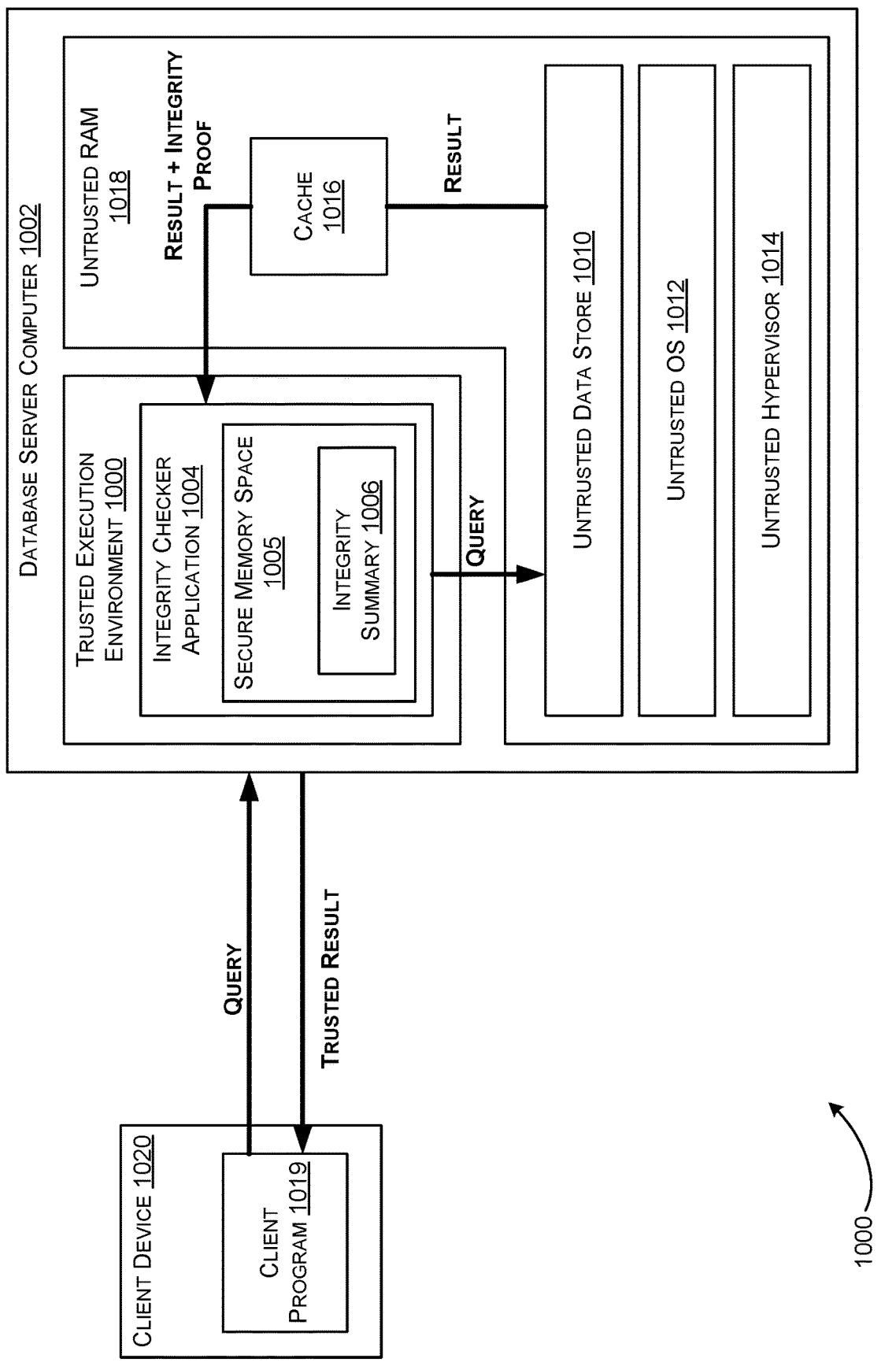
FIG. 10 illustrates a system for ensuring data integrity, in accordance with at least one embodiment.

In at least one embodiment, a database server computer 1002 (e.g., the database server computer 104 of FIG. 1 or the database server computer 510 of FIG. 5) may include a trusted execution environment 1000. The functions of proxy device 102 of FIG. 1 may be performed by the trusted execution environment 1000. Thus, FIG. 10 depicts an embodiment in which the functionality of proxy device 102 is provided at the database server computer 1002. The trusted execution environment 1000 may include a secure memory space 1005 (e.g., the proxy enclave 108 of FIG. 1 which may include the enclave memory 402 of FIG. 4, the enclave memory 502 of FIG. 5, etc.) that may be managed by a chip set (e.g., a SGX chip set, not depicted) of the database server computer 1002.

The trusted execution environment 1000 may include the integrity checker application 1004 and protected code that is executed within the trusted execution environment 1000 to perform the integrity checking features discussed herein. In some embodiments, code integrity checker application 1004 of the integrity checker application 1004 (e.g., the application 110 of FIG. 1) and/or data within the trusted execution environment 1000 (e.g., integrity summary 1006) may be accessed by a processor of the chip set but inaccessible to other systems, devices, or applications other than the integrity checker application 1004.

In some embodiments, untrusted data store 1010, untrusted operating system (OS) 1012, and/or an untrusted hypervisor 1014 may be stored within untrusted RAM 1018. Cache 1016 may also be stored within untrusted RAM 1018. In some embodiments, a Merkle B+-tree (or a portion thereof) of the data stored in untrusted data store 1010 may be stored as the cache 1016. Thus, the cache 1016 may be used to verify data obtained from the untrusted data store 1010 is valid (e.g., untampered). In some embodiments, the integrity summary 1006 may include a portion of the Merkle B+-tree (e.g., the root node, previously-proved nodes, nodes corresponding to the most-accessed data, etc.) within the trusted execution environment 1000.

The integrity checker application 1004 can receive a request (e.g., a query) from client program 1019 operating on client device 1020. The integrity checker application 1004 may forward request (e.g., the query) to the untrusted data store 1010 and check for correctness of the results returned from the untrusted data store 1010 before forwarding to the client device 1020. Since the integrity checker application 1004 is trusted, the protections of the trusted execution environment 1000 may be utilized to host the code of the integrity checker application 1004. For performing integrity checks, the integrity checker application 1004 may store and/or maintain the integrity summary 1006 which may contain at least a portion (e.g., a root node) of a data structure (e.g., a Merkle B+-tree) within the trusted executed environment 1000. For example, the integrity checker application 1004 may store and/or maintain at least a portion of the Merkle B+-tree within the integrity summary 1006). The trusted execution environment 1000 may have direct access to the larger untrusted RAM 1018. Several optimizations may be implemented based on caching and concurrency, and on standard benchmarks as discussed above.

In some embodiments, the integrity summary 1006 includes the root of a Merkle B+-tree that provides hashed values of the data contained in the untrusted data store 1010. The cache 1016 within the untrusted RAM 1018 may include hashed values on the path from a leaf corresponding to the request data to the root. A hash corresponding to the results of a query from the untrusted data store 1010 may be provided to the integrity checker application 1004 along with the actual results of a query. The integrity checker application 1004 may be configured to validate the hash utilizing the integrity summary 1006 which includes at least the root of a Merkle B+-tree generated from the data contained in the untrusted data store 1010. In some embodiments, once validated, the integrity checker application 1004 may save the hash in the integrity summary 1006. A future request for the same data may then be verified by the integrity checker application 1004 using the stored hash.

VII. Example Flow Diagrams

Figure 11:
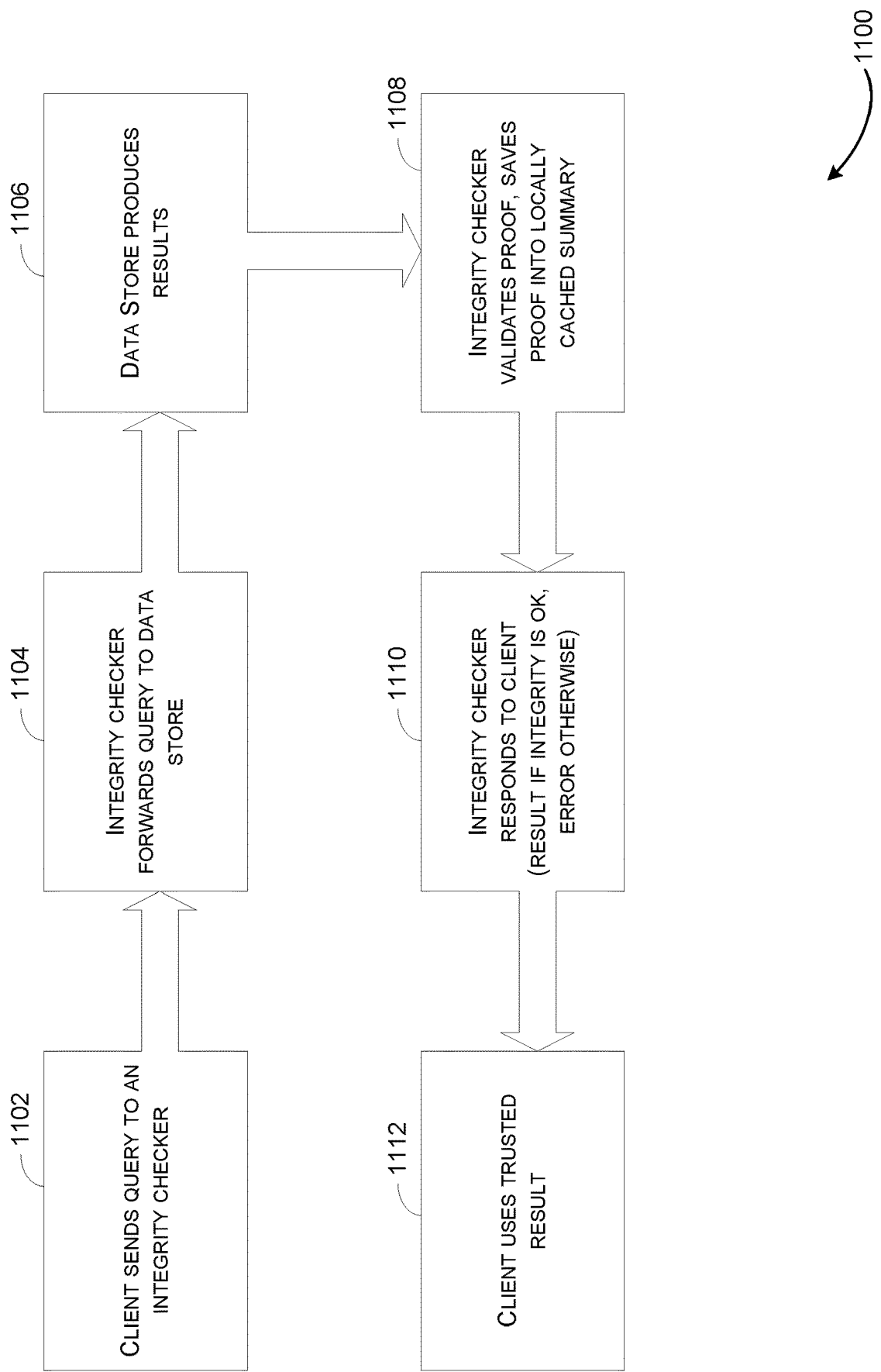
FIG. 11 provides a flow chart of an exemplary method for ensuring data integrity, in accordance with some embodiments.

FIG. 11 provides a flow chart of an exemplary method 1100 for ensuring data integrity, in accordance with some embodiments. The steps of the method 1100 may be performed in any suitable order. It should be appreciated that there may be more or fewer steps than those depicted in FIG. 11.

The method may begin at 1102, where a client sends a query to an application (e.g., the integrity checker application 1004 of FIG. 10). The client may be any suitable device (e.g., a laptop, desktop, mobile phone, etc.). The application may be a protected application (e.g., the application 110 of FIG. 1). The request may pertain to any suitable data that may be stored within a data store (e.g., the untrusted data store 1010 of FIG. 10). In some embodiments, the client may verify (e.g., via an attestation mechanism) at any suitable time that the correct application is being utilized (e.g., a current version of the application, etc.).

At 1104, the integrity checker forwards the query to the data store (e.g., the untrusted data store 1010 of FIG. 10).

For purposes of illustration, the query may correspond to a get operation described above. Thus, the query may indicate that a value is requested for a key k.

At 1106, the data store produces results that may include the actual data value requested as well as a number of hashed values that may utilized to check the integrity of the data value. These hashed values may be collectively referred to as a "proof." As described above, the Merkle tree may store hashed values of all (or some portion) of the data contained in the data store. The proof may be generated by the data store based on retrieving from the Merkle tree hashed values that correspond to nodes along a path from the node associated with the provided data, to the root node. In some embodiments, the proof does not include the root node. In some embodiments, the integrity summary (e.g., the integrity summary 1006 of FIG. 10) stores the root of a Merkle B+-tree that provides hashed values of the data contained in the data store.

At 1108, the integrity checker application 1004 checks the integrity of the data value provided by validating the proof utilizing an integrity summary (e.g., the integrity summary 1006 of FIG. 10 which includes at least the root node's hash value of the Merkle B+-tree). If calculating the root node's hash value from the proof results in a value that matches the stored root node's hash, then the data is considered valid. In some embodiments, the integrity checker may save at least some hashed values of the proof (e.g., in hash cache 404). In some embodiments, future responses from the data store may be validating utilizing these stored hashed values as they have already been validated.

At 1110, if the results are valid, the integrity checker responds to the client's request with the validated results. The results may be considered valid when the hash value computed utilizing the proof matches a stored hash value. If the results are invalid, the integrity checker may respond to the client's request with an indication of error. The results may be considered invalid when the hash value computed utilizing the proof does not match a stored hash value.

At 1112, the client uses the trusted result (or in cases in which the results were invalid, the client may use the indication of error to perform further operations).

Figure 12:
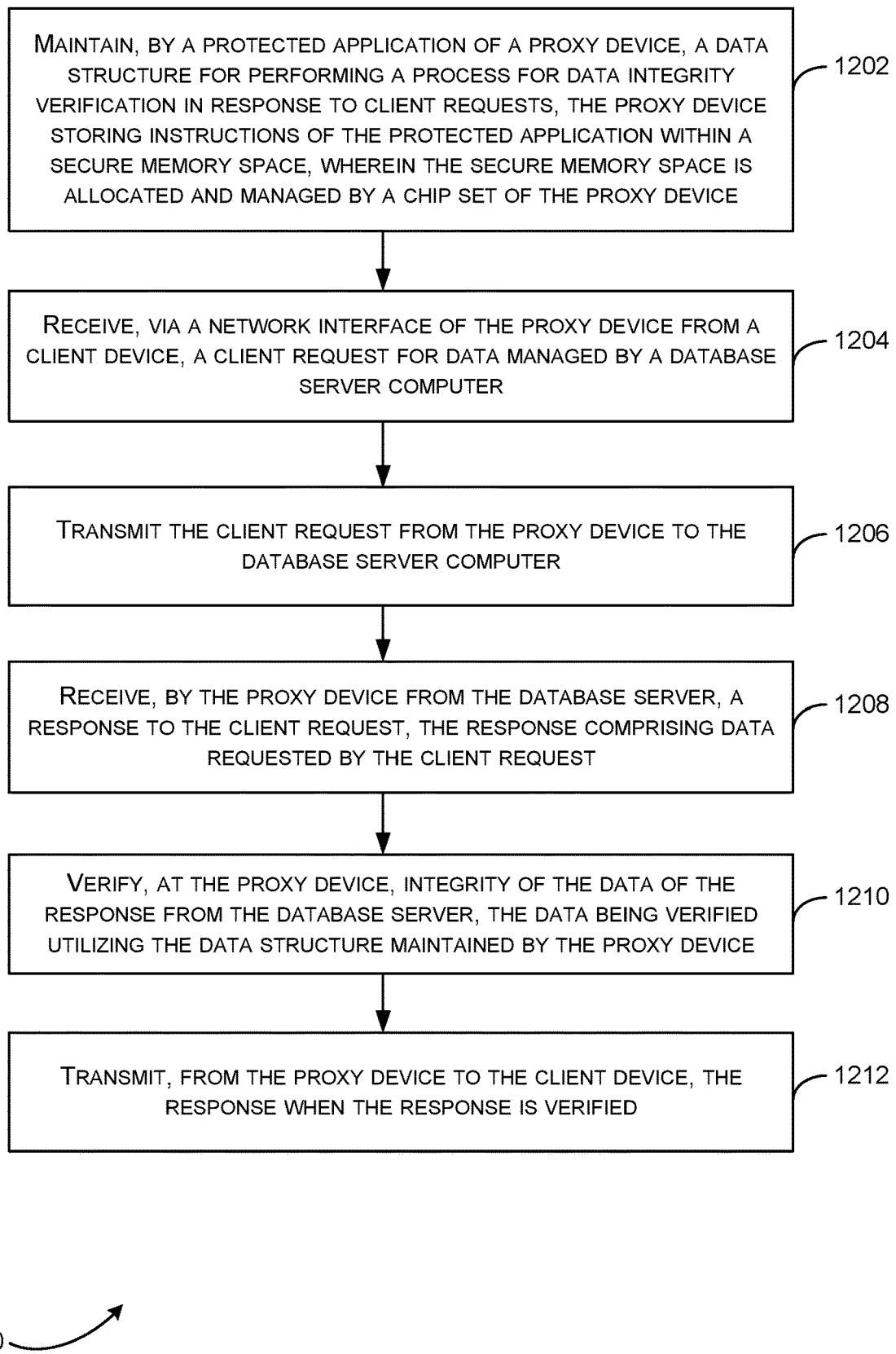
FIG. 12 provides a flow chart of another exemplary method for ensuring data integrity, in accordance with some embodiments.

FIG. 12 provides a flow chart of another exemplary method 1200 for ensuring data integrity, in accordance with some embodiments. The operations of the method 1200 may be performed in any suitable order. It should be appreciated that there may be more or fewer operations than those depicted in FIG. 12. In some embodiments, the operations may be performed by a protected application of a proxy device (e.g., the application 110 of proxy device 102 of FIG. 1, the integrity checker application 1004 of FIG. 10, etc.).

At 1202, a data structure can be maintained (e.g., by integrity checker application 1004). In some embodiments, the data structure may be a Merkle B+-tree that comprises a plurality of nodes, where each of the plurality of nodes comprises at least one of: a key, a version identifier, or a present identifier. At least one node of the plurality of nodes comprise at least on hashed value corresponding to hashed data of a child node of the at least one node. An example of such a tree is provided in FIG. 4. The data structure (e.g., the Merkle B+-tree) may be utilized by the integrity checker application 1004 for performing a process of data integrity verification (e.g., at least a portion of the method 1200) in response to client requests (e.g., data requests received from clients). In some embodiments, the data structure can be stored in untrusted memory (e.g., memory 115 of FIG. 1, memory 113 of FIG. 1, untrusted RAM 1018 of FIG. 10, etc.).

In some embodiments, the proxy device (e.g., the proxy device 102 of FIG. 1, the database server computer 1002 which operates the trusted execution environment 1000) may store the instructions of the protected application (e.g., the application 110, the integrity checker application 1004, etc.) within a secure memory space (e.g., the secure memory space 1005 of FIG. 10, an example of the proxy enclave 108 of FIG. 1). The secure memory space may be allocated and managed by a chip set of the proxy device (e.g., chipset 120 of FIG. 1, a chipset of the database server computer 1002, etc.).

At 1204, a client request for data managed by a database server computer (e.g., the database server computer 104 of FIG. 1, the database server computer 1002 of FIG. 10) can be received. The client request may be received (e.g., at the application 110, at the integrity checker application 1004) via a network interface of the proxy device from a client device (e.g., from the client 106 of FIG. 1, from the client program 1019 of FIG. 10). In some embodiments, the client request is encrypted, but not necessarily so. If encrypted, the client request may be decrypted by the protected application (e.g., the integrity checker application 1004) via any suitable decryption process. In some embodiments, the integrity checker application 1004 can queue the received client request in a message queue for later processing as discussed above in connection with FIG. 5.

At 1206, the client request (perhaps retrieved from a message queue) may be transmitted from the proxy device (e.g., by the application 110 to the database server computer (e.g., the database server computer 104). In some embodiments, the client request may be transmitted by the integrity checker application 1004 to the untrusted data store 1010 of FIG. 10. The untrusted data store 1010 may be an example of the database engine 112 and a database stored in memory 113 of FIG. 1. In either scenario, the client request transmitted to may be a decrypted version of the client request received at 1204. The integrity checker application 1004 and/or the application 110 may be configured to generate the decrypted version of the client request utilizing any suitable decryption algorithm. Thus, the client request transmitted at 1206 may be altered or unaltered. In some embodiments, the client request may include additional data or less data than the data included in client request received at 1204.

At 1208, a response to the client request may be received (e.g., by the application 110 of proxy device 102) from the database server computer (e.g., the database server computer 104). The response may comprise data requested by the client request. In some embodiments, the response may include additional data such as one or more hashed values corresponding to nodes of a path of the data structure. The path may correspond to a path from a leaf corresponding to the requested data to the root node of the data structure.

At 1210, integrity of the data of the response from the database server computer may be verified at the proxy device (e.g., at the application 110, at the integrity checker application 1004, etc.) utilizing the data structure maintained by the proxy device. For example, a Merkle B+-(MB) tree may be maintained by the application 110 within the memory 115. Similarly, the integrity checker application 1004 may maintain a MB tree within cache 1016. At least one node (e.g., the root node of the MB tree) may be stored in protected memory (e.g., proxy enclave 108 of FIG. 1, the secure memory space 1005 of FIG. 10, etc.).

In some embodiments, a plurality of hashes of the data received from the database server computer may be obtained (e.g., by the application 110, by the integrity checker application 1004, etc.). For example, the plurality of hashes may be included in and obtained from the response. Some of the hashes may correspond to nodes of the MB tree that are traversed in a path from a leaf corresponding to the requested data to the root node of the tree. The application 110 or the integrity checker application 1004 may compute a hash corresponding to a root node of the MB tree from the plurality of hashes obtained in the response. If the computed hash matches the stored hash within protected memory (e.g., proxy enclave 108, secure memory space 1005, etc.) the response is deemed to be verified (e.g., by the application 110, by the integrity checker application 1004, etc.). In some embodiments, at least one of the plurality of hashes may be compared to hashed values of the nodes of the stored MB tree. If the plurality of hashes matched the stored hashes within the MB tree, and the computed hash of the root node matches the stored hash associated with the root node, the data may be deemed to be verified (e.g., valid, untampered, etc.).

At 1212, if the response is verified at 1210, the response may be transmitted (e.g., by the application 110, by the integrity checker application 1004, etc.) to the client device (e.g., the client 106, the client program 1019, etc.). In at least one embodiment, hashed values that were compared (e.g., verified) to the stored hash values of the MB tree may be stored in protected memory for subsequent client requests. Thus, another client request which may request at least some of the same data (or data corresponding to a node in a path already determined in a previous client request) may utilize hash values stored within protected memory without rechecking the hash values against the MB tree.

VIII. Example Computer System

A computer system will now be described that may be used to implement any of the entities or components described herein. Subsystems in the computer system are interconnected via a system bus. Additional subsystems include a printer, a keyboard, a fixed disk, and a monitor which can be coupled to a display adapter. Peripherals and input/output (I/O) devices, which can couple to an I/O controller, can be connected to the computer system by any number of means known in the art, such as a serial port. For example, a serial port or external interface can be used to connect the computer apparatus to a wide area network such as the Internet, a mouse input device, or a scanner. The interconnection via system bus allows the central processor to communicate with each subsystem and to control the execution of instructions from system memory or the fixed disk, as well as the exchange of information between subsystems. The system memory and/or the fixed disk may embody a computer-readable medium.

As described, the inventive service may involve implementing one or more functions, processes, operations or method steps. In some embodiments, the functions, processes, operations or method steps may be implemented as a result of the execution of a set of instructions or software code by a suitably-programmed computing device, microprocessor, data processor, or the like. The set of instructions or software code may be stored in a memory or other form of data storage element which is accessed by the computing device, microprocessor, etc. In other embodiments, the functions, processes, operations or method steps may be implemented by firmware or a dedicated processor, integrated circuit, etc.

Any of the software components or functions described in this application may be implemented as software code to be executed by a processor using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary.

What is claimed is:

1. A computer-implemented method of providing secure integrity checking, the computer-implemented method comprising:

maintaining, by a protected application of a proxy device, a tree data structure for performing a process for data integrity verification in response to client requests, the proxy device storing instructions of the protected application within a secure memory space, wherein the secure memory space is allocated and managed by a chip set of the proxy device;

receiving, at a network interface of the proxy device from a client device, a client request for data managed by a database server computer;

transmitting the client request from the proxy device to the database server computer;

receiving, by the proxy device from the database server computer, a response to the client request, the response comprising data requested by the client request;

verifying, at the proxy device, integrity of the data of the response from the database server computer, the data being verified utilizing the tree data structure maintained by the proxy device, wherein the tree data structure comprises a plurality of nodes, each of the plurality of nodes comprising a key, a version identifier, and a present identifier; and transmitting, from the proxy device to the client device, the response when the response is verified.

2. The computer-implemented method of claim 1, wherein the tree data structure is a Merkle B+-tree.

3. The computer-implemented method of claim 2, wherein at least one node of the plurality of nodes comprises at least one hashed value corresponding to hashed data of a child node of the at least one node.

4. The computer-implemented method of claim 3, wherein verifying integrity of the data received from the database server computer comprises:

computing, by the protected application of the proxy device, a plurality of hashes of the data received from the database server computer;

comparing, by the protected application of the proxy device, the plurality of hashes to hashed values associated with a subset of the plurality of nodes of the tree data structure; and determining, by the protected application based on the comparison, that the plurality of hashes match the hashed values associated with the subset of the plurality of nodes of the tree data structure, wherein the integrity of the data is verified based on the determination.

5. The computer-implemented method of claim 4, further comprising:
   storing, by the protected application, the data received in the response in a cache of the secure memory space;
   receiving, at the network interface of the proxy device from the client device, a subsequent client request;
   determining that requested data of the subsequent client request is cached in the secure memory space; and
   providing, by the protected application, the requested data from the cache of the secure memory space.

6. The computer-implemented method of claim 1, wherein the secure memory space in inaccessible to hardware and software of the proxy device other than the chip set.

7. The computer-implemented method of claim 1, wherein the proxy device operates at the database server computer.

8. The computer-implemented method of claim 1, wherein at least a portion of the tree data structure is maintained in an unsecured memory space accessible to the protected application.

9. The computer-implemented method of claim 1, wherein node data corresponding to a root node of the tree data structure is stored in the secure memory space that is accessible only to the chip set.

10. A computer product comprising a non-transitory computer readable medium storing a plurality of instructions for controlling a computer system to perform operations comprising:
    generating, by a protected application of the computer system, a tree data structure for performing a process for data integrity verification in response to client requests, the computer system storing instructions of the protected application within a secure memory space that is allocated and managed by a chip set of the computer system;
    receiving, at a network interface of the computer system, a client request for data maintained within a database accessible to the computer system;
    obtaining, by the computer system from the database, data corresponding to the client request;
    verifying, by the computer system, integrity of the data from the database, the verification utilizing the tree data structure maintained by the computer system, at least a portion of the tree data structure being maintained within the secure memory space, wherein the tree data structure comprises a plurality of nodes, each of the plurality of nodes comprising a key, a version identifier, and a present identifier; and
    transmitting, by the computer system, a response to the client request, the response comprising at least a portion of the verified data.

11. The computer product of claim 10, wherein the operations further comprise:
    computing, by the protected application of the computer system, a plurality of hashed values of the data obtained from the database; and
    storing, by the protected application of the computer system, the plurality of hashed values in a cache maintained within the secure memory space, wherein the cache is utilized to provide subsequent data in response to subsequent client requests.

12. The computer product of claim 11, wherein the plurality of hashed values corresponding to respective nodes in the tree data structure, the respective nodes corresponding to a path from a node containing the requested data to a root node of the tree data structure.

13. The computer product of claim 10, wherein the operations further comprise:
    computing, by the protected application of the computer system, a plurality of hashed values of the data obtained from the database, the plurality of hashed values corresponding to nodes of the tree data structure;
    determining, by the protected application of the computer system, particular data that is requested most often from the database; and
    storing, by the protected application in the secure memory space, hashed values of the plurality of hashed values that correspond to the particular data that is requested most often from the database.

14. The computer product of claim 10, wherein the operations further comprise:
    receiving, by the protected application of the computer system, a subsequent client request for additional data;
    determining a hashed value corresponding to the additional data requested is stored in the secure memory space; and
    transmitting the additional data based at least in part on determining that the hashed value corresponding to the additional data is stored in the secure memory space.

15. The computer product of claim 10, wherein the tree data structure is a Merkle tree.

16. A system comprising:
    a client device;
    a database server computer; and
    a proxy device that stores instructions of a protected application within a secure memory space that is allocated and managed by a chip set of the proxy device, the proxy device being configured to:
        access, by a protected application of a proxy device, a hash tree for performing a process for data integrity verification in response to client requests, the proxy device storing instructions of the protected application within the secure memory space, wherein the secure memory space is allocated and managed by a chip set of the proxy device;
        forward a client request received from the client device to the database server computer, the client request requesting data managed by the database server computer;
        receive, from the database server computer, a response to the client request, the response including database entries comprising at least the data requested;
        verify, at the proxy device, integrity of the response from the database server computer, the verification utilizing the hash tree accessible to the proxy device, a first portion of the hash tree being stored within the secure memory space and a second portion of the hash tree being stored within an unsecure memory space, wherein the hash tree comprises a plurality of nodes, each of the plurality of nodes comprising a key, a version identifier, and a present identifier; and
        transmit the response when the response is verified.

17. The system of claim 16, wherein the secure memory space is inaccessible to hardware and software of the proxy device other than the chip set.

18. The system of claim 16, wherein the proxy device operates at the database server computer.

19. The system of claim 16, wherein a root node of the hash tree is maintained in the secure memory space, and wherein a portion of the hash tree is maintained in an unsecured memory space accessible to the protected application.

20. The system of claim 16, wherein verifying integrity of the response from the database server computer comprises:
- obtaining, from a cache associated with the database server computer, a plurality of hash values related to the data requested by the client device;
- computing a root node hash from the plurality of hash values obtained;
- comparing, by the protected application of the proxy device, the root node hash computed from the plurality of hash values to a stored hash value associated with a root node of the hash tree, the stored hash value of the root node being stored in the secure memory space; and
- determining, by the protected application based on the comparison, that the response is verified based at least in part on determining from the comparison that the root node hash computed from the plurality of hash values matches the stored hash value stored in the secure memory space.

* * * * *

UNITED STATES PATENT AND TRADEMARK OFFICE
CERTIFICATE OF CORRECTION

PATENT NO. : 11,140,134 B2
APPLICATION NO. : 16/189818
DATED : October 5, 2021
INVENTOR(S) : Rohit Sinha and Mihai Christodorescu It is certified that error appears in the above-identified patent and that said Letters Patent is hereby corrected as shown below:

In the Claims

Column 23, Line 17, delete the word "in" and replace with the word is.

Signed and Sealed this
Eighteenth Day of January, 2022

Drew Hirshfeld
*Performing the Functions and Duties of the
Under Secretary of Commerce for Intellectual Property and
Director of the United States Patent and Trademark Office*